(12) United States Patent
Takahashi et al.

(10) Patent No.: US 10,532,912 B2
(45) Date of Patent: Jan. 14, 2020

(54) ROTATING ELECTRICAL MACHINE, HOISTING MACHINE AND ELEVATOR

(71) Applicant: Kabushiki Kaisha Toshiba, Minato-ku (JP)

(72) Inventors: Hiroshi Takahashi, Yokohama (JP); Yasuhito Ueda, Yokohama (JP); Takahiro Kokubo, Kamakura (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 389 days.

(21) Appl. No.: 15/259,741

(22) Filed: Sep. 8, 2016

(65) Prior Publication Data
US 2017/0267493 A1    Sep. 21, 2017

(30) Foreign Application Priority Data
Mar. 16, 2016 (JP) .................. 2016-051905

(51) Int. Cl.
*H02K 1/12* (2006.01)
*B66B 11/04* (2006.01)
(Continued)

(52) U.S. Cl.
CPC ............ *B66B 11/043* (2013.01); *B66B 11/08* (2013.01); *H02K 1/12* (2013.01); *H02K 1/2706* (2013.01);
(Continued)

(58) Field of Classification Search
CPC .... H02K 7/1008; H02K 1/2793; H02K 16/00; H02K 16/005; H02K 16/02;
(Continued)

(56) References Cited

U.S. PATENT DOCUMENTS

| 4,409,506 A | 10/1983 | Ito et al. |
| 6,229,238 B1 | 5/2001 | Graef |

(Continued)

FOREIGN PATENT DOCUMENTS

| CN | 102859842 A | 1/2013 |
| CN | 104578494 A | 4/2015 |

(Continued)

*Primary Examiner* — Nguyen Tran
*Assistant Examiner* — Bryan R Perez
(74) *Attorney, Agent, or Firm* — Oblon, McClelland, Maier & Neustadt, L.L.P.

(57) ABSTRACT

According to one embodiment, a rotating electrical machine includes an annular winding, a stator core, and a rotor core. At least one of the stator core and the rotor core includes a first member and a second member. The first member and the second member are formed in annular shape. The first member and the second member overlap each other in an axial direction of the shaft. The first member includes a slit-shaped first insulation section. The first insulation section extends in the axial direction. The second member includes a slit-shaped second insulation section. The second insulation section extends in the axial direction. The first member and the second member are integrally connected. The first insulation section and the second insulation section are disposed at different positions in the rotation direction.

18 Claims, 22 Drawing Sheets

(51) Int. Cl.
*B66B 11/08* (2006.01)
*H02K 1/27* (2006.01)
*H02K 7/08* (2006.01)
*H02K 16/00* (2006.01)
*H02K 19/10* (2006.01)

(52) U.S. Cl.
CPC ............... *H02K 7/08* (2013.01); *H02K 16/00* (2013.01); *H02K 19/10* (2013.01)

(58) Field of Classification Search
CPC ........ H02K 16/025; H02K 16/04; H02K 7/08; H02K 1/12; H02K 1/2706; H02K 1/145; H02K 1/22; H02K 21/145; H02K 19/10; B66B 11/043; B66B 11/08; B66B 11/04; Y02E 10/721
USPC ... 310/216.074, 216.015–216.035, 114, 266, 310/268
See application file for complete search history.

(56) References Cited

U.S. PATENT DOCUMENTS

| | | | |
|---|---|---|---|
| 6,409,197 B1 | 6/2002 | Endo et al. | |
| 6,933,646 B2 * | 8/2005 | Kinoshita | H02K 1/145 310/179 |
| 2004/0207281 A1 | 10/2004 | Detela | |
| 2005/0173995 A1 | 8/2005 | Lee et al. | |
| 2008/0211326 A1 | 9/2008 | Kang et al. | |
| 2010/0156232 A1 * | 6/2010 | Nashiki | H02K 1/145 310/204 |
| 2013/0015020 A1 * | 1/2013 | Huppunen | B66B 11/0045 187/250 |
| 2014/0132121 A1 | 5/2014 | Gan et al. | |
| 2015/0028727 A1 * | 1/2015 | Watanabe | H02K 3/24 310/60 A |
| 2016/0276880 A1 | 9/2016 | Ueda et al. | |
| 2016/0276881 A1 | 9/2016 | Takahashi et al. | |

FOREIGN PATENT DOCUMENTS

| | | |
|---|---|---|
| EP | 1 155 948 A2 | 11/2001 |
| JP | 57-28553 A | 2/1982 |
| JP | 2000-69731 A | 3/2000 |
| JP | 2001-251835 A | 9/2001 |
| JP | 2001-327139 A | 11/2001 |
| JP | 2005-198497 A | 7/2005 |
| JP | 4085059 B2 | 4/2008 |
| JP | 2009-136090 A | 6/2009 |
| JP | 4743718 B2 | 5/2011 |
| JP | 4773053 B2 | 7/2011 |
| JP | 2014-100054 A | 5/2014 |
| JP | 2015-228730 A | 12/2015 |
| JP | 2016-178786 A | 10/2016 |
| JP | 2016-178820 A | 10/2016 |
| JP | 2017-60299 A | 3/2017 |
| WO | WO 2011/121184 A1 | 10/2011 |

* cited by examiner

ROTATING ELECTRICAL MACHINE, HOISTING MACHINE AND ELEVATOR

CROSS-REFERENCE TO RELATED APPLICATION

This application is based upon and claims the benefit of priority from Japanese Patent Application No. 2016-051905, filed Mar. 16, 2016; the entire contents of which are incorporated herein by reference.

FIELD

Embodiments described herein relate generally to a rotating electrical machine, a hoisting machine, and an elevator.

BACKGROUND

An electromagnetic motor requires high performance for reasons such as energy saving, $CO_2$ reduction, or the like, and representative performance such as reduction in size and weight, high efficiency, high torque, high output, or the like, is remarkably improved every day. Electromagnetic motors can be generally classified according to a direction of magnetic flux into (1) radial flux motors, (2) axial flux motors, and (3) transversal flux motors. Among these, radial flux motors are particularly excellent in cost-performance, and widely used for various products in industrial fields as a representative mechanical element of a universal actuator. In addition, axial flux motors have a three-dimensional complex magnetic path configuration, and in particular, are applied in the field of medium/large-sized large-diameter thin motors.

On the other hand, transversal flux motors include a rotor having permanent magnets, and an armature having an annular coil and a stator core, for example. The annular coil is annularly formed about a rotary shaft. In addition, the stator core is constituted by, for example, a plurality of U-shaped cores (hereinafter referred to as U-shaped stator cores) surrounding the annular coil. According to the above-mentioned transversal flux motor, since multipolarization can be relatively easily realized, a large torque motor with a small size can be obtained. That is, in a radial flux motor or an axial flux motor, a dead space configured to allow insertion of coils into a plurality of slots is needed. On the other hand, in a transversal flux motor, for example, since the plurality of U-shaped stator cores may be arranged in parallel to a rotation direction of the rotary shaft, multipolarization is easily performed in general. In addition, the armature including the annular coil and the U-shaped stator cores has a structure in which a magnetic flux generated by the coil cannot easily leak to the outside. For this reason, generation efficiency of the magnetic field by the coil is increased, and in comparison with the radial flux motor or the axial flux motor having a coil end, reduction in size can be expected.

Incidentally, in rotating electrical machines, additional performance improvement is expected. On the other hand, when stiffness of a rotating electrical machine is decreased, noise may increase.

DETAILED DESCRIPTION

Figure 1A:
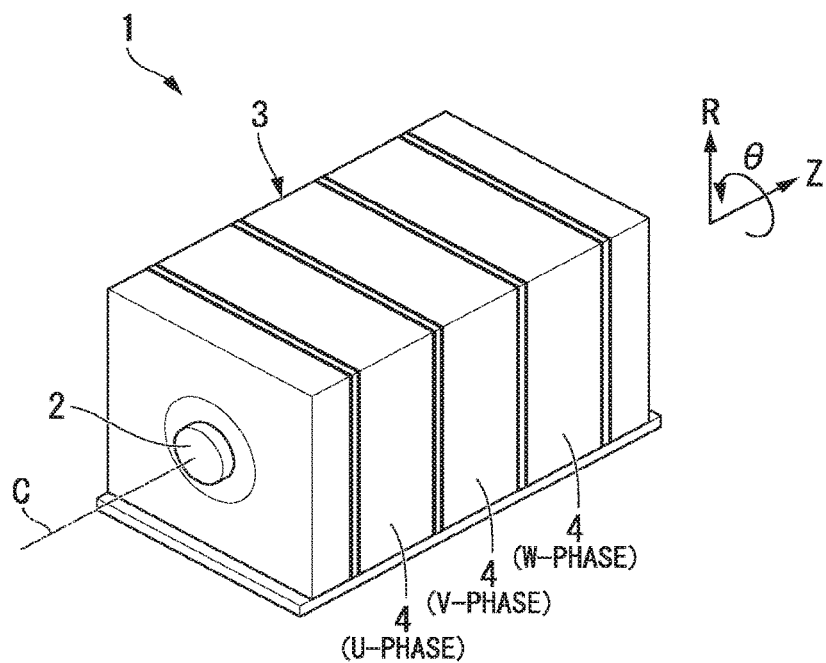
FIG. 1A is a perspective view showing a rotating electrical machine of a first embodiment as a whole.

According to one embodiment, a rotating electrical machine includes a shaft, an annular winding, a stator core, and a rotor core. The annular winding extends in a rotation direction of the shaft. The stator core includes a plurality of stator magnetic poles. The plurality of stator magnetic poles are arranged along the winding. The rotor core includes a plurality of rotor magnetic poles. The plurality of rotor magnetic poles are configured to face the plurality of stator magnetic poles. At least one of the stator core and the rotor core includes a first member and a second member. The first member and the second member are formed in annular shape. The first member and the second member overlap each other in an axial direction of the shaft. The first member includes a slit-shaped first insulation section. The first insulation section extends in the axial direction. The second member includes a slit-shaped second insulation section. The second insulation section extends in the axial direction. The first member and the second member are integrally connected. The first insulation section and the second insulation section are disposed at different positions in the rotation direction.

Hereinafter, a rotating electrical machine, a hoisting machine, and an elevator of embodiments will be described with reference to the accompanying drawings. Further, in the following description, components having the same or similar functions are designated by the same reference numerals. Overlapping description of such components may be omitted.

In addition, for the convenience of description, an axial direction Z, a radial direction R and a rotation direction θ of a shaft 12 will be previously defined. The axial direction Z of the shaft 12 is a direction substantially parallel to a rotary center axis (i.e., an axis) C of a rotating electrical machine 1. The radial direction R of the shaft 12 is a direction substantially perpendicular to the axial direction Z, and a direction radially away from the rotary center axis C and a direction opposite thereto (i.e., a direction toward the rotary center axis C). The rotation direction θ of the shaft 12 is a direction substantially perpendicular to the axial direction Z and the radial direction R, and a direction rotating around the rotary center axis C while maintaining a certain distance from the rotary center axis C.

In addition, "insulation" mentioned in the application is electrical insulation.

(First Embodiment)

First, a rotating electrical machine 1 of a first embodiment will be described with reference to FIGS. 1A to 8.

Figure 1B:
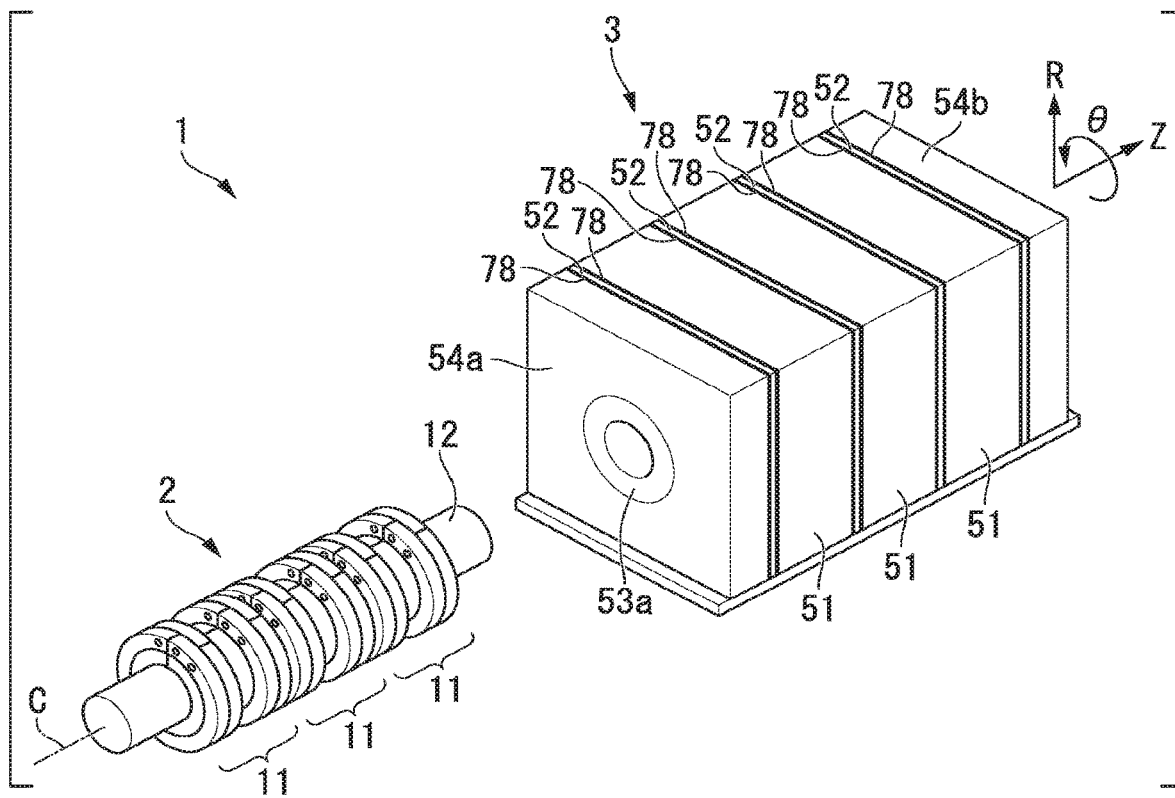
FIG. 1B is a partially exploded perspective view of the rotating electrical machine of the first embodiment.

FIG. 1A is a perspective view showing the rotating electrical machine 1 of the embodiment as a whole. FIG. 1B is a partially exploded perspective view showing the rotating electrical machine 1 shown in FIG. 1A. The rotating electrical machine 1 of the embodiment is a transversal flux motor (i.e., a transversal magnetic flux type motor) in which a magnetic path is formed in the axial direction Z of the shaft 12.

More specifically, the rotating electrical machine 1 of the embodiment includes a rotor 2 and a stator 3. The rotor 2 is formed in a cylindrical shape, and disposed along the rotary center axis C of the rotating electrical machine 1. The rotor 2 is rotatably supported by bearings 53a and 53b (see FIG. 5) of the stator 3, and is rotatable in the rotation direction θ. The stator 3 surrounds the rotor 2 as a whole.

In addition, when seen from another viewpoint, the rotating electrical machine 1 includes a plurality of basic units 4 arranged in the axial direction Z. As shown in FIG. 1B, each of the basic units 4 includes a rotor 11 included in the rotor 2, and an armature 51 included in the stator 3. In the embodiment, the rotating electrical machine 1 is a 3-stage (i.e., 3-phase) type rotating electrical machine, and includes the basic units 4 of three sets (e.g., a U phase, a V phase and a W phase) arranged in the axial direction Z.

Next, the rotor 2 of the embodiment will be described in detail.

As shown in FIG. 1B, the rotor 2 includes the plurality of (e.g., three) rotors 11 arranged in the axial direction Z, and the shaft 12 to which the plurality of rotors 11 are attached. The plurality of rotors 11 are disposed in the basic units 4 that are different from each other. The shaft 12 is formed in a columnar shape in the axial direction Z and inserted into the plurality of rotors 11. The shaft 12 is rotatably supported by the bearings 53a and 53b of the stator 3.

Figure 2:
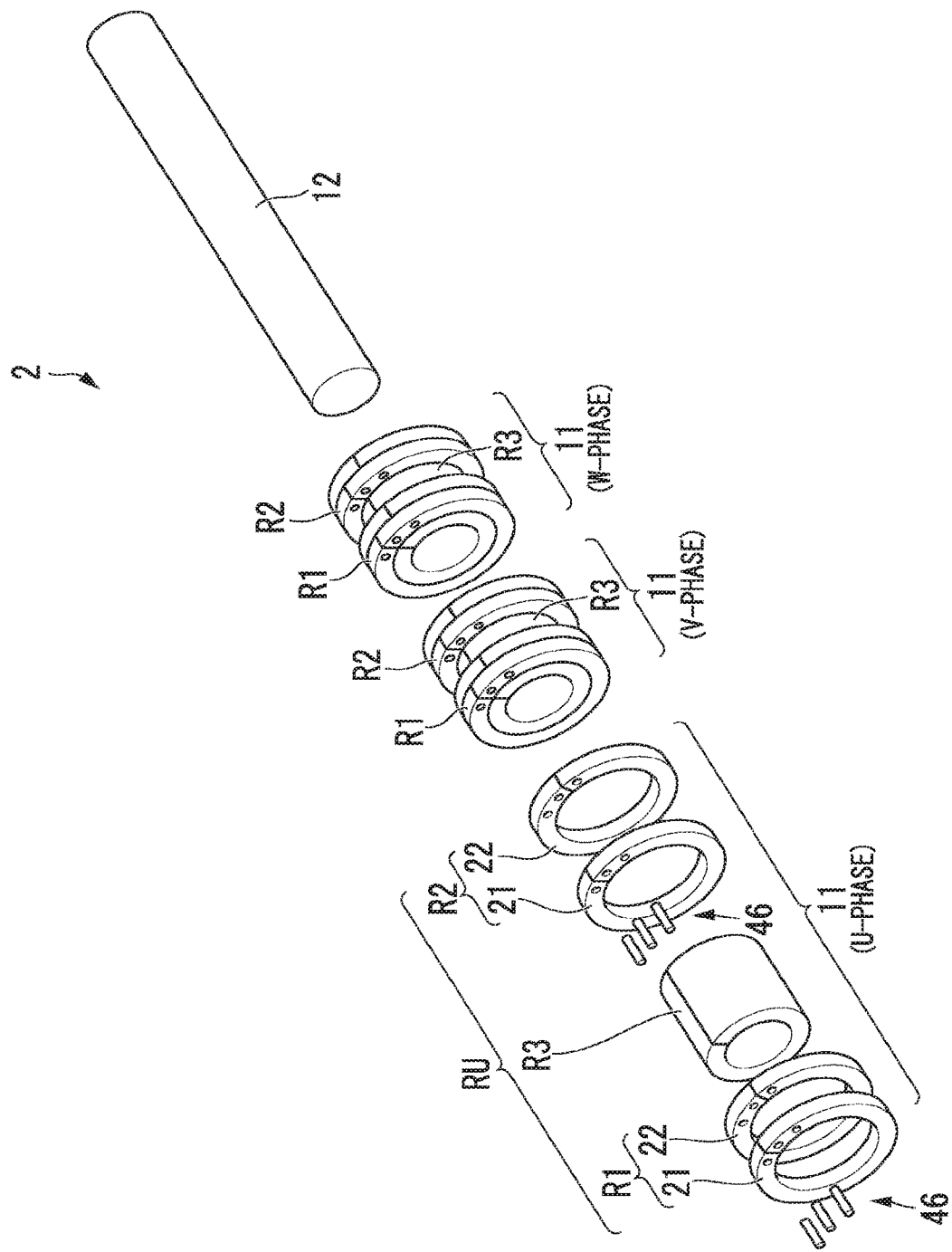
FIG. 2 is a partially exploded perspective view of a rotor of the first embodiment.

FIG. 2 is a partially exploded perspective view of the rotor 2.

As shown in FIG. 2, each of the rotors 11 of the rotor 2 includes a first rotor core R1, a second rotor core R2, and a third rotor core R3. The first rotor core R1 is an example of "a first core (i.e., a first core member)." The second rotor core R2 is an example of "a second core (i.e., a second core member)." The third rotor core R3 is an example of "a third core (i.e., a third core member)." The first rotor core R1, the second rotor core R2 and the third rotor core R3 are connected to and integrated with each other to form one rotor core (i.e., a rotor core unit) RU from another viewpoint.

As shown in FIG. 2, the first rotor core R1 and the second rotor core R2 are disposed to be separated from each other in the axial direction Z. Each of the first rotor core R1 and the second rotor core R2 is formed in an annular shape in the rotation direction θ (i.e., an annular shape about the rotary center axis C). Each of the first rotor core R1 and the second rotor core R2 includes a plurality of (e.g., 24) rotor magnetic poles Mr (see FIG. 3A) in the outer circumferential surfaces of the first rotor core R1 and the second rotor core R2, for example, by installing a plurality of permanent magnets (not shown). The plurality of rotor magnetic poles Mr are arranged in the rotation direction θ. For example, the plurality of rotor magnetic poles Mr are disposed such that N poles and S poles are alternately arranged in the rotation direction θ on the outer circumferential surfaces of the first rotor core R1 and the second rotor core R2. The plurality of rotor magnetic poles Mr face a plurality of stator magnetic poles Ms (to be described below) of the armature 51 in the radial direction R.

As shown in FIG. 2, each of the first rotor core R1 and the second rotor core R2 is divided into a plurality of members in the axial direction Z. For example, each of the first rotor core R1 and the second rotor core R2 is divided into a first member 21 and a second member 22 in the axial direction Z. The first member 21 and the second member 22 are formed in annular shapes in the rotation direction θ (i.e., annular shapes about the rotary center axis C), and have substantially the same contour. The first member 21 and the second member 22 overlap each other in the axial direction Z. Each of the first member 21 and the second member 22 includes the above-mentioned plurality of rotor magnetic poles Mr.

Figure 3A:
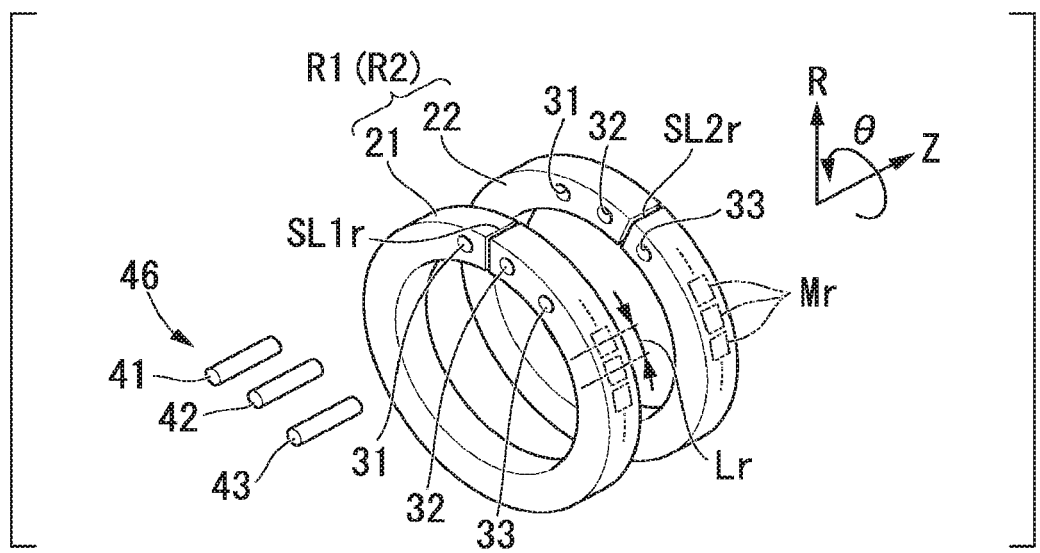
FIG. 3A is an exploded perspective view of a first rotor core of the first embodiment.
Figure 3B:
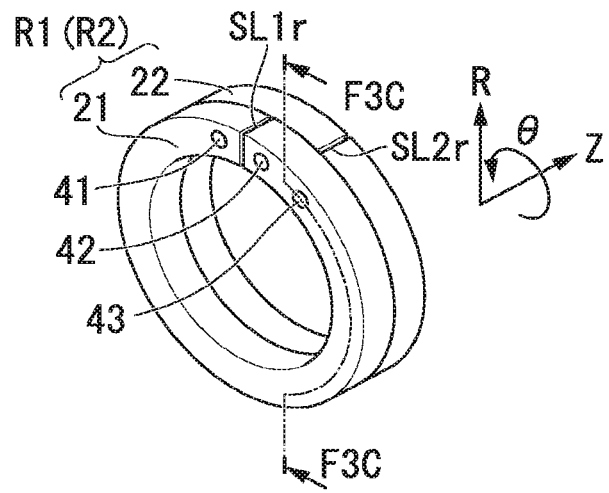
FIG. 3B is a perspective view showing a state after assembly of the first rotor core of the first embodiment.
Figure 3C:
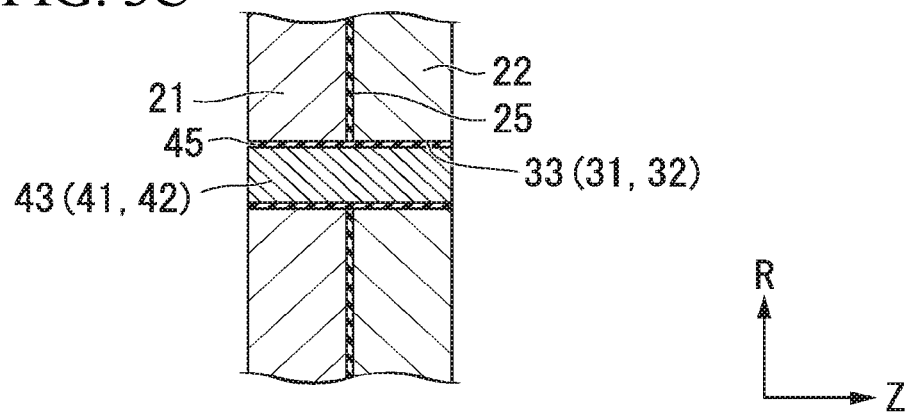
FIG. 3C is a cross-sectional view taken along line F3C-F3C of the first rotor core shown in FIG. 3B.

FIG. 3A is an exploded perspective view showing the first rotor core R1. FIG. 3B is a perspective view showing a state after assembly of the first rotor core R1. FIG. 3C is a cross-sectional view taken along line F3C-F3C of the first rotor core R1 shown in FIG. 3B.

As shown in FIG. 3A, the first member 21 of the embodiment has a slit-shaped first insulation section SL1r (hereinafter referred to as the first insulation slit SL1r) formed in the axial direction Z. The first insulation slit SL1r of the embodiment passes through the first member 21 in the axial direction Z. For example, the first insulation slit SL1r has a through-groove passing through the first member 21 in the axial direction Z, and the through-groove is filled with an insulator which may include air or a vacuum. The first insulation slit SL1r is formed in a portion of the first member 21 in the rotation direction θ. In addition, the first insulation slit SL1r passes from an inner circumferential surface to an outer circumferential surface of the first member 21 in the radial direction R. The first insulation slit SL1r electrically cuts (i.e., blocks) an annular electrical path formed in the first member 21 in the rotation direction θ. Further, the insulator filled in the through-groove is not limited to air or a vacuum but may be a substantial object such as insulating paper or a synthetic resin member. Definition related to the insulator is also similar to another slit-shaped insulation section.

Similarly, the second member 22 has a slit-shaped second insulation section SL2r (hereinafter referred to as the second insulation slit SL2r) formed in the axial direction Z. The second insulation slit SL2r of the embodiment passes through the second member 22 in the axial direction Z. For example, the second insulation slit SL2r has a through-groove passing through the second member 22 in the axial direction Z, and the through-groove is filled with an insulator which may include air or a vacuum. The second insulation slit SL2r is formed in a portion of the second member 22 in the rotation direction θ. In addition, the second insulation slit SL2r passes through an inner circumferential surface to an outer circumferential surface of the second member 22 in the radial direction R. The second insulation slit SL2r electrically cuts (i.e., blocks) an annular electrical path formed in the second member 22 in the rotation direction θ.

Then, as shown in FIG. 3B, the first member 21 and the second member 22 are integrally connected in a state in which the first insulation slit SL1r and the second insulation slit SL2r are disposed in different positions (i.e., positions deviated from each other) in the rotation direction θ. In other words, the first insulation slit SL1r and the second insulation slit SL2r do not face each other in the axial direction Z. In addition, when seen from another viewpoint, the first insulation slit SL1r faces a region of the second member 22 in which no slit is formed. The second insulation slit SL2r faces a region of the first member 21 in which no slit is formed. For example, the first member 21 and the second member 22 have the same shape as each other and are disposed such that the first insulation slit SL1r and the second insulation slit SL2r do not overlap each other by matching different surfaces (i.e., opposite surfaces) of the first member 21 and the second member 22.

In the embodiment, as shown in FIG. 3A, the first insulation slit SL1r and the second insulation slit SL2r are deviated largely more than a distance Lr between magnetic poles of the two rotor magnetic poles Mr neighboring in the rotation direction θ. "The distance between the magnetic poles" disclosed in this application is a distance between a center in the rotation direction θ of one of the two magnetic poles neighboring in the rotation direction θ and a center in the rotation direction θ of the other magnetic pole. Further, a deviation amount between the first insulation slit SL1r and the second insulation slit SL2r is not limited to the above-mentioned example.

As shown in FIG. 3C the first rotor core R1 of the embodiment includes a first rotor insulating layer 25 formed in a boundary between the first member 21 and the second member 22. The first rotor insulating layer 25 is an example of "the first insulating layer." For example, the first rotor insulating layer 25 is an insulating sheet (e.g., insulating paper or a synthetic resin sheet) sandwiched between the first member 21 and the second member 22. The first rotor insulating layer 25 is disposed between the first member 21 and the second member 22 in the axial direction Z, and insulates the boundary between the first member 21 and the second member 22. Further, "the insulating layer formed in the boundary between the two members" disclosed herein is not limited to the insulating sheet sandwiched between the two members but may be an insulating layer formed on a surface of at least one of the two members. The above-mentioned insulating layer is formed by performing, for example, insulation processing (e.g., oxidation, coating of an insulating material, or the like) on a surface of the member. Definition related to the insulating layer is the same as in another insulating layer. In addition, the term "the insulating layer" used herein is used in contrast with the term "the slit-shaped insulation section" for the sake of convenience. For this reason, the term "the insulating layer" may be substituted with "an insulation section," "a surface insulation section," or the like.

Next, a connecting structure connecting the first member 21 and the second member 22 will be described.

As shown in FIG. 3A, each of the first member 21 and the second member 22 has a first attachment hole 31, a second attachment hole 32, and a third attachment hole 33, which are opened in the axial direction Z. The first attachment hole 31, the second attachment hole 32, and the third attachment hole 33 are arranged in the rotation direction θ.

The first attachment hole 31 of the first member 21 and the first attachment hole 31 of the second member 22 are disposed at corresponding positions (i.e., substantially the same positions) in the rotation direction θ, and come in communication with each other in the axial direction Z. Similarly, the second attachment hole 32 of the first member 21 and the second attachment hole 32 of the second member 22 are disposed at corresponding positions (i.e., substantially the same positions) in the rotation direction θ, and come in communication with each other in the axial direction Z. The third attachment hole 33 of the first member 21 and the third attachment hole 33 of the second member 22 are disposed at corresponding positions (i.e., substantially the same positions) in the rotation direction θ, and come in communication with each other in the axial direction Z.

In addition, the first rotor core R1 includes a first fixing member 41, a second fixing member 42, and a third fixing member 43. The first fixing member 41 is inserted into the first attachment hole 31 of the first member 21 and the first attachment hole 31 of the second member 22, and connects the first member 21 and the second member 22. The second fixing member 42 is inserted into the second attachment hole 32 of the first member 21 and the second attachment hole 32 of the second member 22, and connects the first member 21 and the second member 22. The third fixing member 43 is inserted into the third attachment hole 33 of the first member 21 and the third attachment hole 33 of the second member 22, and connects the first member 21 and the second member 22. The first fixing member 41, the second fixing member 42, and the third fixing member 43 are arranged in the rotation direction θ. Each of the first fixing member 41, the second fixing member 42, and the third fixing member 43 may be pin members press-fitted into the attachment holes 31, 32 and 33, bolts threadedly engaged with the attachment holes 31, 32 and 33, or other fixing members.

Then, as shown in FIG. 3A and FIG. 3B, the first insulation slit SL1r of the embodiment is formed between the first fixing member 41 and the second fixing member 42 in the rotation direction θ (i.e., between the first attachment hole 31 of the first member 21 and the second attachment hole 32 of the first member 21). On the other hand, the second insulation slit SL2r is formed in a region which is different from a region between the first fixing member 41 and the second fixing member 42. For this reason, the first fixing member 41 and the second fixing member 42 are connected to each other by a portion of the second member 22 in which no slit is formed (i.e., a portion that is not divided by the slit).

Similarly, the second insulation slit SL2r is formed between the second fixing member 42 and the third fixing member 43 in the rotation direction θ (i.e., between the second attachment hole 32 of the second member 22 and the third attachment hole 33 of the second member 22). On the other hand, the first insulation slit SL1r is formed in a region which is different from a region between the second fixing member 42 and the third fixing member 43. For this reason, the second fixing member 42 and the third fixing member 43 are connected to each other by a portion of the first member 21 in which no slit is formed (i.e., a portion that is not divided by the slit).

In addition, as shown in FIG. 3C, each of the first fixing member 41, the second fixing member 42, and the third fixing member 43 may have an insulation section 45 formed on at least a surface thereof. For example, each of the first fixing member 41, the second fixing member 42, and the third fixing member 43 has the insulation section 45 formed by performing insulation processing on a surface thereof. Instead of this, each of the first fixing member 41, the second fixing member 42, and the third fixing member 43 may have the insulation section 45 formed on at least the surface thereof by forming each of the members as an insulation member. Further, the insulation sections 45 of the first fixing member 41, the second fixing member 42 and the third fixing member 43 are not essential components.

Further, in the embodiment, a connecting structure including the attachment holes 31, 32 and 33 and the fixing members 41, 42 and 43 having the above-mentioned configurations is referred to as "a connecting structure 46."

Next, the third rotor core R3 will be described.

Figure 4A:
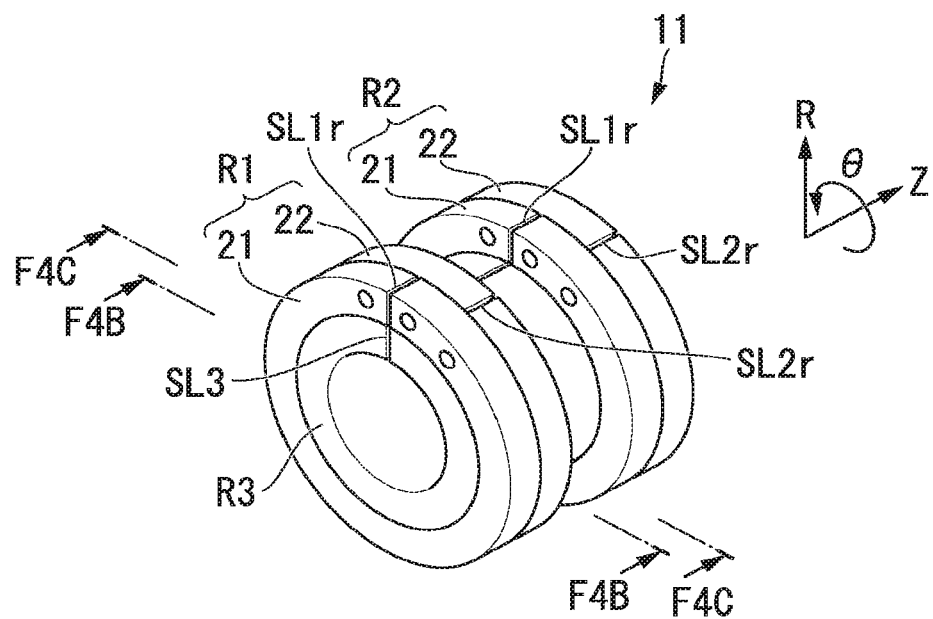
FIG. 4A is a perspective view showing a state after assembly of the rotor of the first embodiment.
Figure 4B:
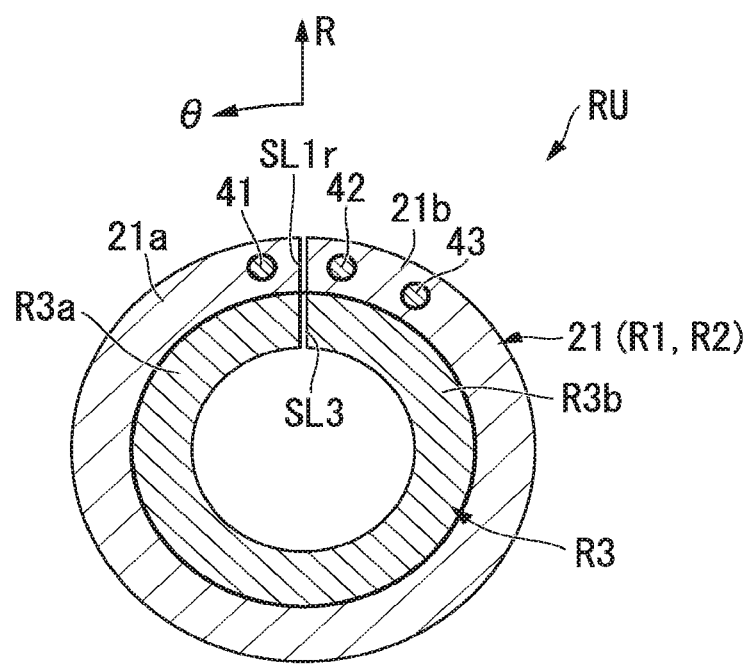
FIG. 4B is a cross-sectional view taken along line F4B-F4B of the rotor shown in FIG. 4A.
Figure 4C:
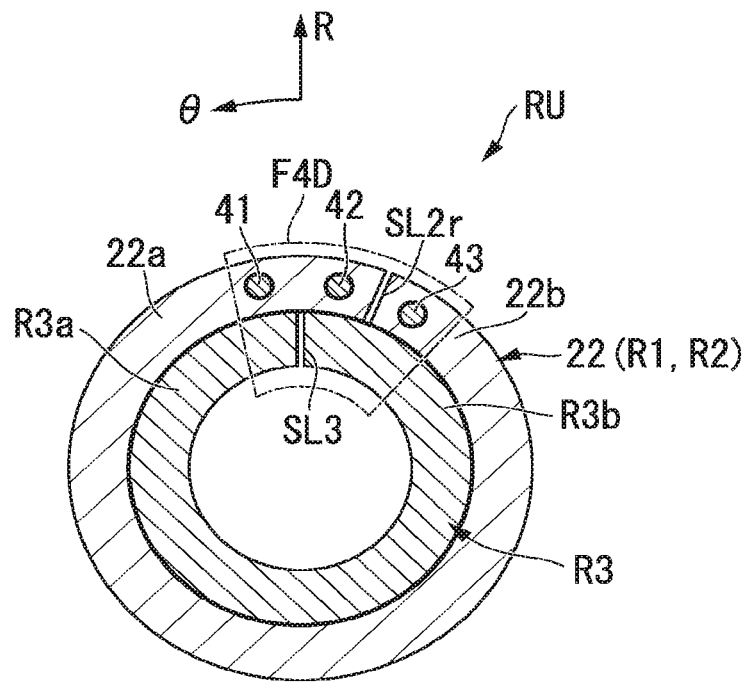
FIG. 4C is a cross-sectional view taken along line F4C-F4C of the rotor shown in FIG. 4A.
Figure 4D:
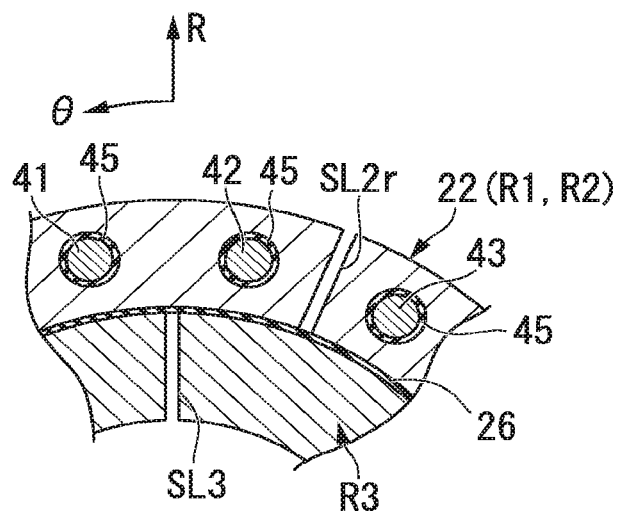
FIG. 4D is an enlarged cross-sectional view of a region surrounded by line F4D of the rotor shown in FIG. 4C.

FIG. 4A is a perspective view showing a state after assembly of the rotor 11. FIG. 4B is a cross-sectional view taken along line F4B-F4B of the rotor 11 shown in FIG. 4A. FIG. 4C is a cross-sectional view taken along line F4C-F4C of the rotor 11 shown in FIG. 4A. FIG. 4D is an enlarged cross-sectional view of a region surrounded by a line F4 of the rotor 11 shown in FIG. 4C.

As shown in FIG. 4A, the third rotor core R3 is formed in an annular shape along inner circumferential surfaces of the first rotor core R1 and the second rotor core R2, and is fitted into the first rotor core R1 and the second rotor core R2. The third rotor core R3 faces the first rotor core R1 and the second rotor core R2 in the radial direction R to magnetically connect the first rotor core R1 and the second rotor core R2. Accordingly, for example, a magnetic path (i.e., a magnetic flux path) is formed from the first rotor core R1 toward the second rotor core R2 via the third rotor core R3. Further, "magnetic connection" disclosed herein means a positional relation in which a magnetic flux passes between the two members, and also includes a case in which there is no physical contact between the two members.

As shown in FIG. 2, the third rotor core R3 of the embodiment has a slit-shaped third insulation section SL3 (hereinafter referred to as the third insulation slit SL3) formed in the axial direction Z. The third insulation slit SL3 of the embodiment passes through the third rotor core R3 in the axial direction Z. For example, the third insulation slit SL3 has a through-groove passing through the third rotor core R3 in the axial direction Z, and the through-groove is filled with an insulator which may include air or a vacuum. The third insulation slit SL3 is formed in a portion of the third rotor core R3 in the rotation direction θ. In addition, the third insulation slit SL3 passes from the inner circumferential surface to the outer circumferential surface of the third rotor core R3 in the radial direction R. The third insulation slit SL3 electrically cuts (i.e., blocks) an annular electrical path formed in the third rotor core R3 in the rotation direction θ.

Then, as shown in FIG. 4B, the third rotor core R3 is integrally connected to the first member 21 and the second member 22 in a state in which the third insulation slit SL3 is disposed at a position corresponding to the first insulation slit SL1r in the rotation direction θ (i.e., substantially the same position in the rotation direction θ). That is, the third insulation slit SL3 faces the first insulation slit SL1r in the radial direction R. Here, in the embodiment, the first member 21 has a first portion 21a and a second portion 21b separately disposed at both sides of the first insulation slit SL1r. The third rotor core R3 has a first portion R3a and a second portion R3b separately disposed at both sides of the third insulation slit SL3. The first portion 21a of the first member 21 is adjacent to the first portion R3a of the third rotor core R3, and magnetically connected to the first portion R3a of the third rotor core R3. The second portion 21b of the first member 21 is adjacent to the second portion R3b of the third rotor core R3, and magnetically connected to the second portion R3b of the third rotor core R3.

On the other hand, as shown in FIG. 4C, the third rotor core R3 is integrally connected to the first member 21 and the second member 22 in a state in which the third insulation slit SL3 is disposed at a different position from the second insulation slit SL2r in the rotation direction θ (i.e., a position deviated from the second insulation slit SL2r). That is, the third insulation slit SL3 dose not face the second insulation slit SL2r in the radial direction R. The third insulation slit SL3 faces a region of the second member 22 in which no slit is formed. Here, in the embodiment, the second member 22 has a first portion 22a and a second portion 22b separately disposed at both sides of the second insulation slit SL2r. The first portion 22a of the second member 22 is adjacent to the first portion R3a of the third rotor core R3, and magnetically connected to the first portion R3a of the third rotor core R3. The second portion 22b of the second member 22 is adjacent to the second portion R3b of the third rotor core R3, and magnetically connected to the second portion R3b of the third rotor core R3.

In addition, as shown in FIG. 4D, the rotor 11 includes a second rotor insulating layer 26 provided in at least one of a boundary between the first member 21 and the third rotor core R3 and a boundary between the second member 22 and the third rotor core R3. The second rotor insulating layer 26 is an example of "a second insulating layer." In the embodiment, the second rotor insulating layer 26 is provided in at least the boundary between the second member 22 and the third rotor core R3. The second rotor insulating layer 26 is disposed between the second member 22 and the third rotor core R3 in the radial direction R (e.g., at least between the first portion 22a of the second member 22 and the second portion R3b of the third rotor core R3) to electrically insulate the boundary between the second member 22 and the third rotor core R3.

Next, the stator 3 of the embodiment will be described in detail.

Figure 5:
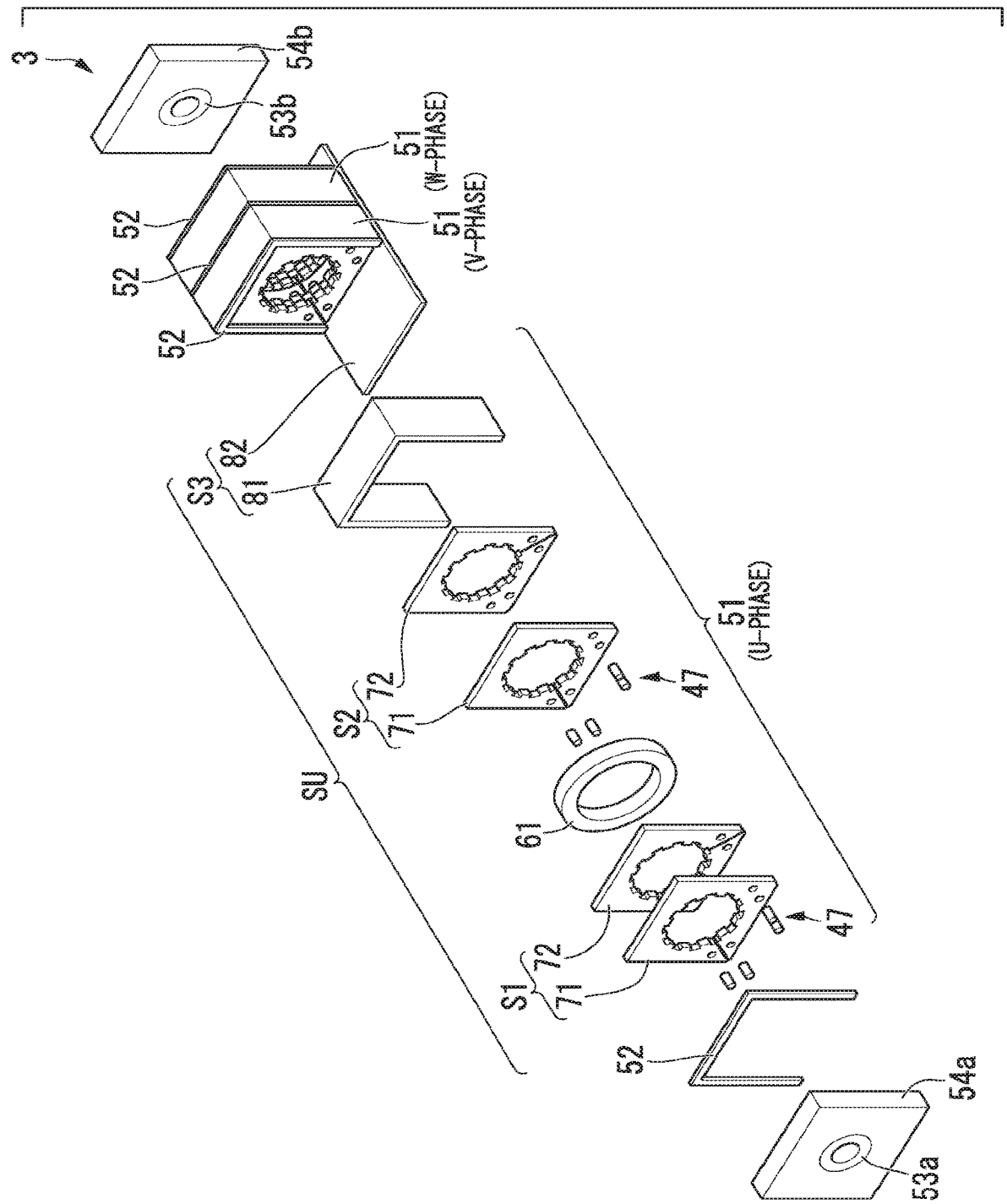
FIG. 5 is a partially exploded perspective view of a stator of the first embodiment.

FIG. 5 is a partially exploded perspective view showing the stator 3.

As shown in FIG. 5, the stator 3 includes a plurality of (e.g., three) armatures 51 arranged in the axial direction Z, a plurality of spacers 52, a pair of bearings 53a and 53b, and a pair of bearing holders 54a and 54b. The plurality of armatures 51 are disposed to correspond to the basic units 4 that are different from each other. Each of the armatures 51 is disposed to oppose the rotor 11 of the rotor 2 with a predetermined gap in the radial direction R. The plurality of spacers 52 are disposed between the plurality of armatures 51. The one bearing holder 54a is disposed at one end of the rotating electrical machine 1 and holds the bearing 53a. The other bearing holder 54b is disposed at the other end of the rotating electrical machine 1 and holds the bearing 53b.

As shown in FIG. 5, each of the armatures 51 includes a winding 61, a first stator core S1, a second stator core S2 and a third stator core S3. The first stator core S1 is another example of "a first core (i.e., a first core member)." The second stator core S2 is another example of "a second core (i.e., a second core member)." The third stator core S3 is another example of "a third core (i.e., a third core member)." The first stator core S1, the second stator core S2 and the third stator core S3 are integrally connected to each other to form one stator core (i.e., a stator core unit) SU when seen from another viewpoint.

The winding 61 of the embodiment is a ring coil formed in an annular shape in the rotation direction θ (i.e., an annular shape about the rotary center axis C). The winding 61 is installed at each of the basic units 4 one by one. That is, the rotating electrical machine 1 of the embodiment includes a total of three windings 61. For example, currents having phases differing by 120 degrees are supplied to the three windings 61. Further, the phases of the currents supplied to the windings 61 are not limited to the above-mentioned example.

As shown in FIG. 5, the first stator core S1 and the second stator core S2 are separately disposed from each other in the axial direction Z, and separately disposed at both sides of the winding 61 in the axial direction Z. Each of the first stator core S1 and the second stator core S2 is formed in an annular shape in the rotation direction θ (i.e., an annular shape about the rotary center axis C). "The annular shape" used herein widely refers to a configuration having a center space. "The annular shape" used herein is not limited to the case in which a contour is a circular shape but may include the case in which a contour is a rectangular shape. Each of the first stator core S1 and the second stator core S2 of the embodiment has a rectangular contour.

Figure 6A:
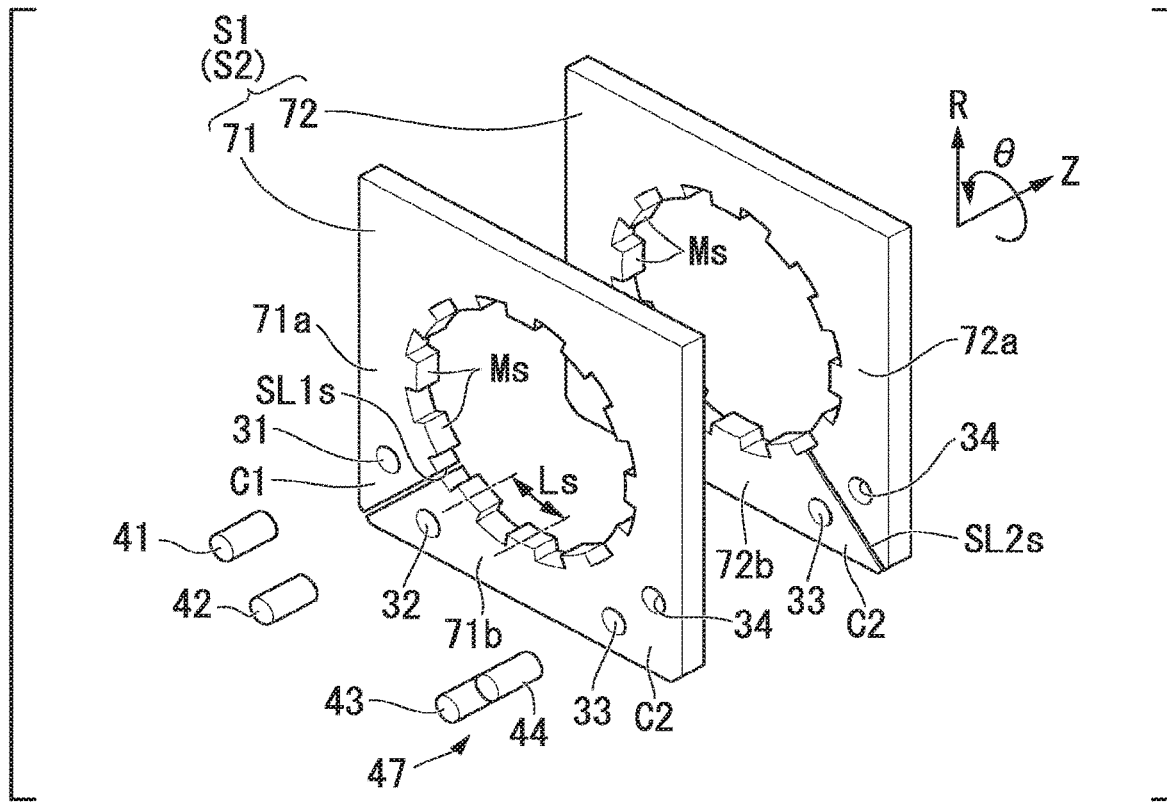
FIG. 6A is an exploded perspective view of a first stator core of the first embodiment.

In addition, each of the first stator core S1 and the second stator core S2 includes a plurality of (e.g., 12) stator magnetic poles Ms in the inner circumferential surfaces of the first stator core S1 and the second stator core S2 (see FIG. 6A). Each of the stator magnetic poles Ms is formed by a projection protruding from the inner circumferential surface of the first stator core S1 or the second stator core S2 toward the inside in the radial direction R. The plurality of stator magnetic poles Ms are arranged along the winding 61 in the rotation direction θ. The plurality of stator magnetic poles Ms are excited as current is supplied to the windings 61.

As shown in FIG. 5, each of the first stator core S1 and the second stator core S2 is divided into a plurality of members in the axial direction Z. For example, each of the first stator core S1 and the second stator core S2 is divided into a first member 71 and a second member 72 in the axial direction Z. For example, each of the first member 71 and the second member 72 is an electromagnetic steel plate (e.g., lamination steel plate). At least one of the first member 71 and the second member 72 may be a plurality of electromagnetic steel plates (e.g., lamination steel plates). The first member 71 and the second member 72 have annular shapes in the rotation direction θ (annular shapes about the rotary center axis C), and have substantially the same contour. The first member 71 and the second member 72 overlap each other in the axial direction Z. Each of the first member 71 and the second member 72 includes the above-mentioned plurality of stator magnetic poles Ms.

Figure 6B:
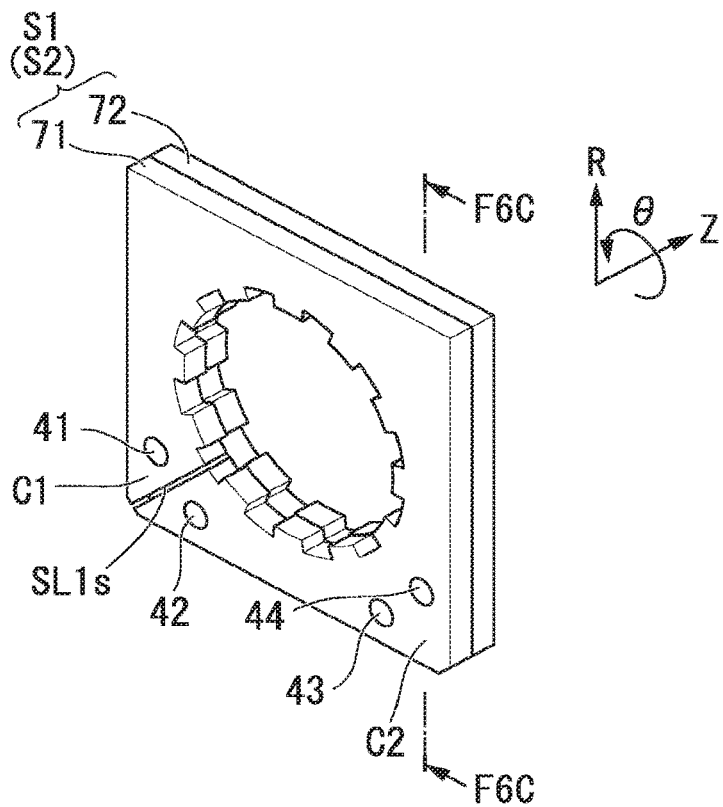
FIG. 6B is a perspective view showing a state after assembly of the first stator core of the first embodiment.
Figure 6C:
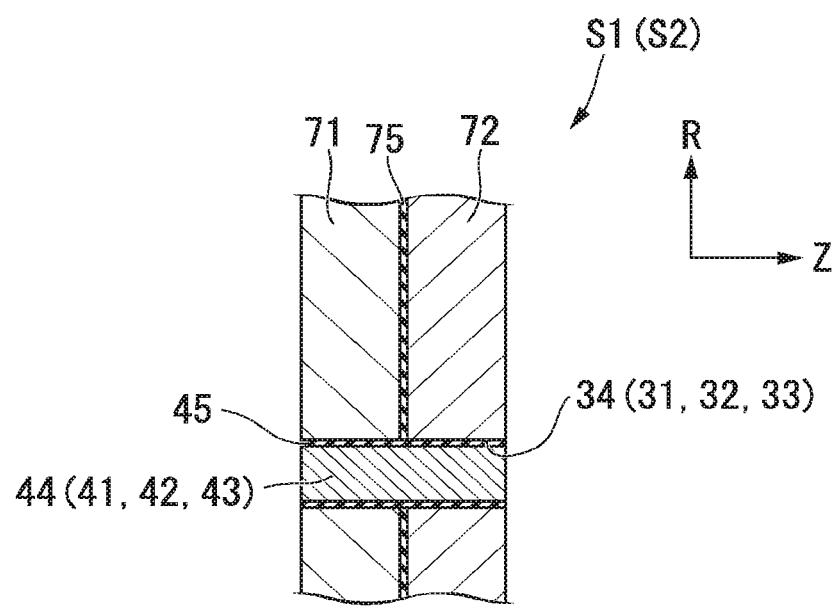
FIG. 6C is a cross-sectional view taken along line F6C-F6C of the first stator core shown in FIG. 6B.

FIG. 6A is an exploded perspective view showing the first stator core S1. FIG. 6B is a perspective view showing a state after assembly of the first stator core S1. FIG. 6C is a cross-sectional view taken along line F6C-F6C of the first stator core S1 shown in FIG. 6B.

As shown in FIG. 6A, the first member 71 of the embodiment has a slit-shaped first insulation section SL1s (hereinafter referred to as the first insulation slit SL1s) formed in the axial direction Z. The first insulation slit SL1s of the embodiment passes through the first member 71 in the axial direction Z. For example, the first insulation slit SL1s has a through-groove passing through the first member 71 in the axial direction Z, and the through-groove is filled with an insulator which may include air or a vacuum. The first insulation slit SL1s is formed in a portion of the first member 71 in the rotation direction θ. In addition, the first insulation slit SL1s passes from the inner circumferential surface to the outer circumferential surface of the first member 71 in the radial direction R. The first insulation slit SL1s electrically cuts (i.e., blocks) an annular electrical path formed in the first member 71 in the rotation direction θ.

Similarly, the second member 72 has a slit-shaped second insulation section SL2s (hereinafter referred to as the second insulation slit SL2s) formed in the axial direction Z. The second insulation slit SL2s of the embodiment passes through the second member 72 in the axial direction Z. For example, the second insulation slit SL2s has a through-groove passing through the second member 72 in the axial direction Z, and the through-groove is filled with an insulator which may include air or a vacuum. The second insulation slit SL2s is formed in a portion of the second member 72 in the rotation direction θ. In addition, the second insulation slit SL2s passes from the inner circumferential surface to the outer circumferential surface of the second member 72 in the radial direction R. The second insulation slit SL2s electrically cuts (i.e., blocks) an annular electrical path formed in the second member 72 in the rotation direction θ.

Then, as shown in FIG. 6B, the first member 71 and the second member 72 are integrally connected to each other in a state in which the first insulation slit SL1s and the second insulation slit SL2s are disposed at different positions (i.e., positions deviated from each other) in the rotation direction θ. In other words, the first insulation slit SL1s and the second insulation slit SL2s do not face each other in the axial direction Z. In addition, when seen from another viewpoint, the first insulation slit SL1s faces a region of the second member 72 in which no slit is formed. The second insulation slit SL2s faces a region of the first member 71 in which no slit is formed. For example, the first member 71 and the second member 72 have the same shape as each other and are disposed such that the first insulation slit SL1s and the second insulation slit SL2s do not overlap each other by matching the surfaces (i.e., opposite surfaces) of the first member 71 and the second member 72. In the embodiment, each of the first stator core S1 and the second stator core S2 has a first corner section C1 and a second corner section C2. The second corner section C2 is a corner section disposed adjacent to the first corner section C1 in the rotation direction θ. The first insulation slit SL1s is formed in the first corner section C1. The second insulation slit SL2s is formed in the second corner section C2.

In the embodiment, as shown in FIG. 6A, the first insulation slit SL1s and the second insulation slit SL2s are deviated largely more than a distance Ls between magnetic poles of the two stator magnetic poles Ms neighboring in the rotation direction θ. Further, a deviation amount between the first insulation slit SL1s and the second insulation slit SL2s is not limited to the above-mentioned example.

As shown in FIG. 6C, the first stator core S1 includes a first stator insulating layer 75 (e.g., an insulating sheet, an insulating layer formed by insulation processing, or the like) formed on a boundary between the first member 71 and the second member 72. The first stator insulating layer 75 is another example of "a first insulating layer." The first stator insulating layer 75 is disposed between the first member 71 and the second member 72 in the axial direction Z to electrically insulate the boundary between the first member 71 and the second member 72.

Next, a connecting structure between the first member 71 and the second member 72 will be described.

As shown in FIG. 6A, each of the first member 71 and the second member 72 has a first attachment hole 31, a second attachment hole 32, a third attachment hole 33, and a fourth attachment hole 34, which are opened in the axial direction Z. The first attachment hole 31, the second attachment hole 32, the third attachment hole 33 and the fourth attachment hole 34 are arranged in the rotation direction θ.

The first attachment hole 31 of the first member 71 and the first attachment hole 31 of the second member 72 are disposed at corresponding positions (i.e., substantially the same positions) in the rotation direction θ, and come in communication with each other in the axial direction Z. Similarly, the second attachment hole 32 of the first member 71 and the second attachment hole 32 of the second member 72 are disposed at the corresponding positions (i.e., substantially the same positions) in the rotation direction θ, and come in communication with each other in the axial direction Z. The third attachment hole 33 of the first member 71 and the third attachment hole 33 of the second member 72 are disposed at corresponding positions (i.e., substantially the same positions) in the rotation direction θ, and come in communication with each other in the axial direction Z. The fourth attachment hole 34 of the first member 71 and the fourth attachment hole 34 of the second member 72 are disposed at corresponding positions (i.e., substantially the same positions) in the rotation direction θ, and come in communication with each other in the axial direction Z.

In addition, the first stator core S1 includes a first fixing member 41, a second fixing member 42, a third fixing member 43, and a fourth fixing member 44. The first fixing member 41 is inserted into the first attachment hole 31 of the first member 71 and the first attachment hole 31 of the second member 72, and connects the first member 71 and the second member 72. The second fixing member 42 is inserted into the second attachment hole 32 of the first member 71 and the second attachment hole 32 of the second member 72, and connects the first member 71 and the second member 72. The third fixing member 43 is inserted into the third attachment hole 33 of the first member 71 and the third attachment hole 33 of the second member 72, and connects the first member 71 and the second member 72. The fourth fixing member 44 is inserted into the fourth attachment hole 34 of the first member 71 and the fourth attachment hole 34 of the second member 72, and connects the first member 71 and the second member 72. The first fixing member 41, the second fixing member 42, the third fixing member 43, and the fourth fixing member 44 are arranged in the rotation direction θ. The first fixing member 41, the second fixing member 42, the third fixing member 43, and the fourth fixing member 44 may be pin members press-fitted into the attachment holes 31, 32, 33 and 34, bolts threadedly engaged with the attachment holes 31, 32, 33 and 34, respectively, or other fixing members.

Then, as shown in FIG. 6A and FIG. 6B, the first insulation slit SL1s of the embodiment is formed between the first fixing member 41 and the second fixing member 42 in the rotation direction θ (i.e., between the first attachment hole 31 of the first member 71 and the second attachment hole 32 of the first member 71). On the other hand, the second insulation slit SL2s is formed in a region which is different from a region between the first fixing member 41 and the second fixing member 42. For this reason, the first fixing member 41 and the second fixing member 42 are connected to each other by a portion of the second member 72 in which no slit is formed (i.e., a portion that is not divided by the slit).

Similarly, the second insulation slit SL2s is formed between the third fixing member 43 and the fourth fixing member 44 in the rotation direction θ (i.e., between the third attachment hole 33 of the second member 72 and the fourth attachment hole 34 of the second member 72). On the other hand, the first insulation slit SL1s is formed in a region which is different from a region between the third fixing member 43 and the fourth fixing member 44. For this reason, the third fixing member 43 and the fourth fixing member 44 are connected to each other by a portion of the first member 71 in which no slit is formed (i.e., a portion that is not divided by the slit).

In addition, as shown in FIG. 6C, each of the first fixing member 41, the second fixing member 42, the third fixing member 43, and the fourth fixing member 44 may have the insulation section 45 formed on at least a surface thereof. For example, each of the first fixing member 41, the second fixing member 42, the third fixing member 43 and, the fourth fixing member 44 has the insulation section 45 formed by performing insulation processing on the surface thereof. Instead of this, each of the first fixing member 41, the second fixing member 42, the third fixing member 43, and the fourth fixing member 44 may have the insulation section 45 formed on at least the surface thereof by forming each of the members as an insulation member. Further, the insulation sections 45 of the first fixing member 41, the second fixing member 42, the third fixing member 43, and the fourth fixing member 44 are not essential components.

Further, in the embodiment, a connecting structure including the attachment holes 31, 32, 33 and 34 and the fixing members 41, 42, 43 and 44, which were described above, is referred to as "a connecting structure 47."

Next, the third stator core S3 will be described.

Figure 7:
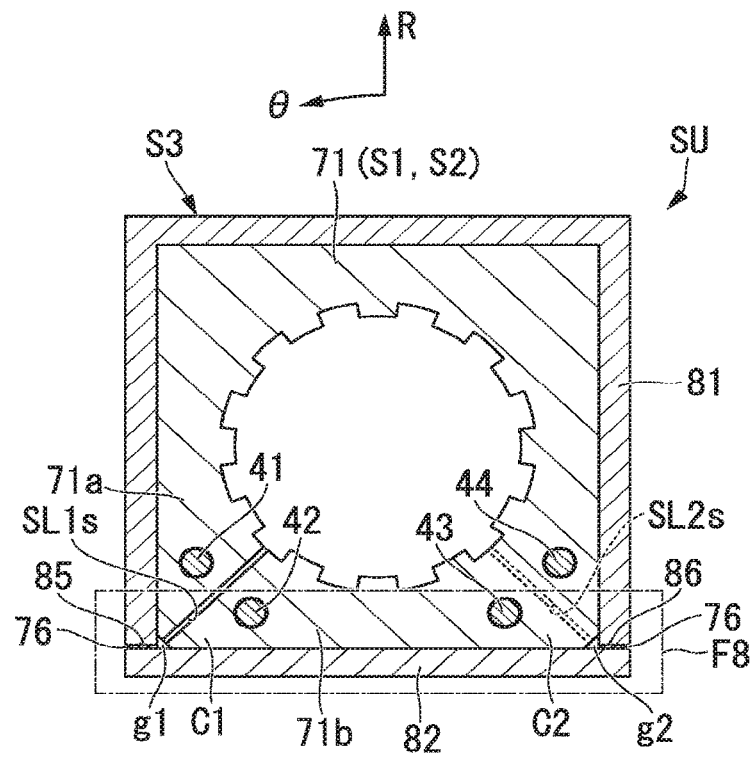
FIG. 7 is a cross-sectional view showing an armature of the first embodiment.

FIG. 7 is a cross-sectional view showing the armature 51.

As shown in FIG. 5 and FIG. 7, the third stator core S3 is formed in a rectangular frame shape to surround the winding 61, the first stator core S1 and the second stator core S2 from the outside, and fitted onto the winding 61, the first stator core S1 and the second stator core S2. The third stator core S3 faces the first stator core S1 and the second stator core S2 in the radial direction R and magnetically connects the first stator core S1 and the second stator core S2. Accordingly, for example, a magnetic path (i.e., a magnetic flux path) is formed from the first stator core S1 toward the second stator core S2 via the third stator core S3.

As shown in FIG. 5 and FIG. 7, the third stator core S3 is divided into at least a first member 81 and a second member 82 in the rotation direction θ. The first member 81 is an example of "a third member." The second member 82 is an example of "a fourth member." The first member 81 of the embodiment is formed in a gate type, one side of which is opened, and surrounds the winding 61, the first stator core S1 and the second stator core S2 in three directions. On the other hand, the second member 82 of the embodiment is formed in a flat plate shape, and assembled with the first member 81 to close an internal space of the first member 81 in one direction. The second member 82 faces the winding 61, the first stator core S1 and the second stator core S2 from a different direction from the first member 81.

As shown in FIG. 7, the third stator core S3 includes a first connecting section 85 and a second connecting section 86 which are configured to connect the first member 81 and the second member 82. The first connecting section 85 is a connecting section configured to connect one end of the first member 81 and the second member 82. The second connecting section 86 is a connecting section configured to connect the other end of the first member 81 and the second member 82.

In addition, the third stator core S3 includes a second stator insulating layer 76 (e.g., an insulating sheet, an insulating layer formed by insulation processing, or the like) in each of the first connecting section 85 and the second connecting section 86. The second stator insulating layer 76 is an example of "a third insulating layer." For example, the second stator insulating layer 76 of the first connecting section 85 is provided in a boundary between one end of the first member 81 and the second member 82, and electrically insulates the first member 81 and the second member 82 from each other. Accordingly, the second stator insulating layer 76 of the first connecting section 85 electrically cuts (i.e., blocks) an annular electrical path formed in the third stator core S3 in the rotation direction θ. Similarly, the second stator insulating layer 76 of the second connecting section 86 is provided in a boundary between the other end of the first member 81 and the second member 82, and electrically insulates the first member 81 and the second member 82 from each other. Accordingly, the second stator insulating layer 76 of the second connecting section 86 electrically cuts (i.e., blocks) an annular electrical path formed in the third stator core S3 in the rotation direction θ.

Then, as shown in FIG. 7, the third stator core S3 is integrally connected to the first member 71 and the second member 72 in a state in which the first connecting section 85 (i.e., the second stator insulating layer 76) is disposed at a position corresponding to the first insulation slit SL1s in the rotation direction θ (i.e., substantially the same position in the rotation direction θ). Here, the first member 71 has a first portion 71a and a second portion 71b separately disposed at both sides of the first insulation slit SL1s. The first portion 71a of the first member 71 is adjacent to the first member 81, and magnetically connected to the first member 81. On the other hand, the second portion 71b of the first member 71 is adjacent to the second member 82, and magnetically connected to the second member 82.

In the embodiment, a first gap g1 having a triangular shape and surrounded by the first member 71, the first member 81 and the second member 82 is formed at a distal end of the first corner section C1 of each of the first stator core S1 and the second stator core S2. The first gap g1 is an example of "an insulation section." The first gap g1 may be filled with air or a vacuum or may be buried by an insulator having a physical shape such as a synthetic resin member. The first insulation slit SL1s communicates with the first gap g1. Since the first gap g1 is provided, the first portion 71a of the first member 71 is electrically insulated from the second member 82. In addition, the second portion 71b of the first member 71 is insulated from the first member 81.

On the other hand, the third stator core S3 is integrally connected to the first member 71 and the second member 72 in a state in which the second connecting section 86 (i.e., the second stator insulating layer 76) is disposed at a position corresponding to the second insulation slit SL2s in the rotation direction θ (i.e., substantially the same position in the rotation direction θ). Here, as shown in FIG. 6A, the second member 72 has a first portion 72a and a second portion 72b divided at both sides of the second insulation slit SL2s. The first portion 72a of the second member 72 is adjacent to the first member 81, and magnetically connected to the first member 81. On the other hand, the second portion 72b of the second member 72 is adjacent to the second member 82, and magnetically connected to the second member 82.

In the embodiment, a second gap g2 having a triangular shape and surrounded by the second member 72, the first member 81 and the second member 82 is formed at a distal end of the second corner section C2 of each of the first stator core S1 and the second stator core S2. The second gap g2 is an example of "an insulation section." The second gap g2 may be filled with air or a vacuum or may be buried by an insulator having a physical shape such as a synthetic resin member. The second insulation slit SL2s communicates with the second gap g2. Since the second gap g2 is provided, the first portion 72a of the second member 72 is electrically insulated from the second member 82. In addition, the second portion 72b of the second member 72 is electrically insulated from the first member 81.

Figure 8:
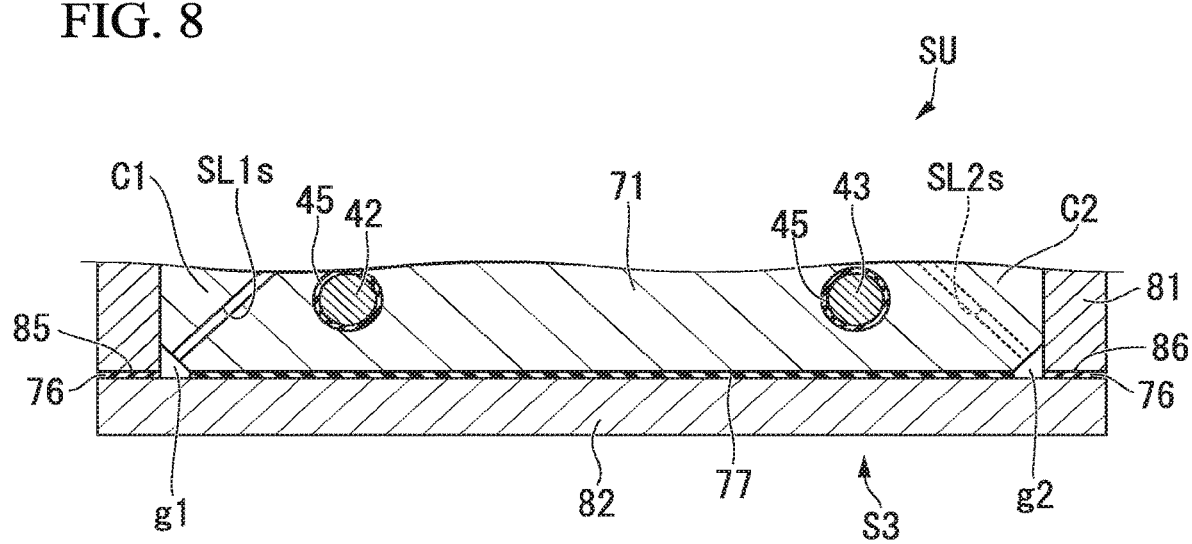
FIG. 8 is an enlarged cross-sectional view of a region surrounded by line F8 of the armature shown in FIG. 7.

FIG. 8 is an enlarged cross-sectional view showing a region of the armature 51 shown in FIG. 7 surrounded by line F8. As shown in FIG. 8, the armature 51 may include a third stator insulating layer 77 provided in at least one of a boundary between the first member 71 and the third stator core S3 and a boundary between the second member 72 and the third stator core S3. The third stator insulating layer 77 is another example of "a second insulating layer." In the embodiment, the third stator insulating layer 77 is provided in a boundary between the first member 71 and the second member 82 of the third stator core S3, and electrically insulates the boundary between the first member 71 and the second member 82 of the third stator core S3. In addition, the third stator insulating layer 77 is provided in a boundary between the second member 72 and the second member 82 of the third stator core S3, and electrically insulates the boundary between the second member 72 and the second member 82 of the third stator core S3.

Next, the spacers 52 of the embodiment will be described.

As shown in FIG. 1B, the plurality of spacers 52 are disposed between the plurality of basic units 4, and the plurality of basic units 4 are separated from each other. In the embodiment, the rotating electrical machine 1 includes a fourth stator insulating layer 78 (e.g., an insulating sheet, an insulating layer by insulation processing, or the like) provided in each of boundarys between the plurality of basic units 4 and the spacers 52. The fourth stator insulating layer 78 is an example of "a fourth insulating layer." The fourth stator insulating layer 78 is disposed between the basic unit 4 and the spacer 52 in the axial direction Z, and electrically insulates the boundary between the basic unit 4 and the spacer 52.

Next, an action of the rotating electrical machine 1 of the embodiment will be described.

When the rotating electrical machine 1 is driven, a circulating current (i.e., an induced current, a surrounding eddy current) orbiting the rotary center axis C is generated. However, in the embodiment, the first members 21 of the first rotor core R1 and the second rotor core R2 have the first insulation slits SL1r, and thus the electrical path in the rotation direction θ is blocked. For this reason, generation of the circulating current in the first member 21 can be suppressed. Similarly, the second members 22 of the first rotor core R1 and the second rotor core R2 have the second insulation slits SL2r, and thus the electrical path in the rotation direction θ is blocked. For this reason, generation of the circulating current in the second member 22 can be suppressed.

In addition, in the embodiment, the third rotor core R3 has the third insulation slit SL3, and thus the electrical path in the rotation direction θ is blocked. For this reason, generation of the circulating current in the third rotor core R3 can be suppressed.

Further, in the embodiment, the third insulation slit SL3 of the third rotor core R3 is disposed at a position corresponding to the first insulation slit SL1r of the first member 21 in the rotation direction θ. For this reason, the electrical path in which the circulating current generated in the first member 21 flows while bypassing the third rotor core R3 is blocked. For this reason, generation of the circulating current in the first member 21 can be reliably suppressed. In addition, in the embodiment, the boundary between the third rotor core R3 and the second member 22 is electrically insulated by the second rotor insulating layer 26. For this reason, the electrical path in which the circulating current generated in the second member 22 flows while bypassing the third rotor core R3 is blocked. For this reason, generation of the circulating current in the second member 22 can be reliably suppressed.

Similarly, in the embodiment, the first members 71 of the first stator core S1 and the second stator core S2 have the first insulation slits SL1s, and thus the electrical path in the rotation direction θ is blocked. For this reason, generation of the circulating current in the first member 71 can be suppressed. Similarly, the second members 72 of the first stator core S1 and the second stator core S2 have the second insulation slits SL2s, and thus the electrical path in the rotation direction θ is blocked. For this reason, generation of the circulating current in the second member 72 can be suppressed.

In addition, in the embodiment, the third stator core S3 includes the second stator insulating layers 76 provided in the first connecting section 85 and the second connecting section 86, and thus the electrical path in the rotation direction θ is blocked. For this reason, generation of the circulating current in the third stator core S3 can be suppressed.

Further, in the embodiment, the first connecting section 85 (i.e., the insulating layer 76) of the third stator core S3 is disposed at a position corresponding to the first insulation slit SL1s of the first member 71 in the rotation direction θ. For this reason, the electrical path of the circulating current flowing from the first member 71 while bypassing the third stator core S3 is blocked. For this reason, generation of the circulating current in the first member 71 can be reliably suppressed. In addition, in the embodiment, the second connecting section 86 (i.e., the insulating layer 76) of the third stator core S3 is disposed at a position corresponding to the second insulation slit SL2s of the second member 72 in the rotation direction θ. For this reason, the electrical path of the circulating current flowing from the second member 72 while bypassing the third stator core S3 is blocked. For this reason, generation of the circulating current in the second member 72 can be reliably suppressed.

According to the rotating electrical machine 1 having the above-mentioned configuration, performance can be improved, and high stiffness can be maintained. That is, in the general rotating electrical machine, for example, a decrease in dynamic torque in a high speed rotation region may occur. This is because induced voltage is decreased by an influence of the circulating current generated in various kinds of cores.

Here, in the rotating electrical machine 1 of the embodiment, the first members 21 and 71 of the rotor core RU and the stator core SU have the first insulation slits SL1r and SL1s formed in the axial direction Z. In addition, the second members 22 and 72 of the rotor core RU and the stator core SU have the second insulation slits SL2r and SL2s formed in the axial direction Z. According to the above-mentioned configuration, generation of the circulating current in the first members 21 and 71 and the second members 22 and 72 can be suppressed. Accordingly, improvement of performance of the rotating electrical machine 1 (e.g., improvement of dynamic torque in a high speed rotation region) can be achieved.

Here, when the slit-shaped insulation sections are formed at the rotor core RU and the stator core SU, stiffness of the rotor core RU and the stator core SU around the slit is decreased, and the decrease in stiffness is expected to cause vibration (e.g., noise). Here, in the embodiment, the first members 21 and 71 and the second members 22 and 72 are integrally connected in a state in which the first insulation slits SL1r and SL1s and the second insulation slits SL2r and SL2s are disposed at different positions in the rotation direction θ. According to the above-mentioned configuration, a decrease in stiffness of the rotor core RU and the stator core SU around the slits is suppressed, and high stiffness as a whole can be maintained. If the high stiffness of the rotor core RU and the stator core SU can be maintained, even when a magnetic force is generated, for example, in the rotation direction θ with respect to the stator magnetic poles Ms and in an intermittently varied direction according to rotation driving, vibration (e.g., noise) or the like caused by a decrease in stiffness can be suppressed Further, as a method of suppressing generation of the circulating current, a configuration using a pressed powder core or a configuration using a spirally laminated plate is also considered. However, the pressed powder core is limited to a small motor or a partial use due to manufacturing restrictions, manufacturing cost thereof is high, and introduction of dedicated equipment is also required. In addition, similarly, in the spirally laminated plate, availability or funding cost thereof is high, and introduction of dedicated equipment is also required. For this reason, these configurations cannot be easily applied to mass-produced motors. On the other hand, the configuration of the embodiment does not require a special element, the configuration of the embodiment can be manufactured at a relatively low price, and applicability to the mass-produced motors is good.

In the embodiment, the rotor core RU and the stator core SU include the insulating layers 25 and 75 provided in the boundaries between the first members 21 and 71 and the second members 22 and 72 to electrically insulate the first members 21 and 71 from the second members 22 and 72. According to the above-mentioned configuration, the electrical path of the circulating current flowing from the first members 21 and 71 while bypassing the second members 22 and 72 or the electrical path of the circulating current flowing from the second members 22 and 72 while bypassing the first members 21 and 71 can be blocked. Accordingly, generation of the circulating current in the first members 21 and 71 and the second members 22 and 72 can be more reliably suppressed.

In the embodiment, at least one of the rotor core RU and the stator core SU includes first cores R1 and S1 and second cores R2 and S2 separately disposed in the axial direction Z, and third cores R3 and S3 facing the first cores R1 and S1 and the second cores R2 and S2 in the radial direction R and configured to magnetically connect the first cores R1 and S1 to the second cores R2 and S2. At least one of the first cores R1 and S1 and the second cores R2 and S2 includes the first members 21 and 71 and the second members 22 and 72. At least portions of the third cores R3 and S3 are electrically insulated from at least one of the first members 21 and 71 and the second members 22 and 72. According to the above-mentioned configuration, an electrical path of a circulating current flowing from the first members 21 and 71 and the second members 22 and 72 while bypassing the third cores R3 and S3 can be blocked. Accordingly, generation of the circulating current in the first members 21 and 71 and the second members 22 and 72 can be more reliably suppressed.

In the embodiment, at least one of the rotor core RU and the stator core SU includes the insulating layers 26 and 77 provided in least one of a boundary between the first members 21 and 71 and the third cores R3 and S3 and a boundary between the second members 22 and 72 and the third cores R3 and S3 and electrically insulates the boundary between the first members 21 and 71 and the third cores R3 and S3 and the boundary between the second members 22 and 72 and the third cores R3 and S3. According to the above-mentioned configuration, regardless of the position of the slit, the electrical path of the circulating current flowing from the first members 21 and 71 and the second members 22 and 72 while bypassing the third cores R3 and S3 can be blocked. Accordingly, a degree of design freedom can be increased.

In the embodiment, the third rotor core R3 has the third insulation slit SL3 formed in the axial direction Z. The third rotor core R3 is integrally connected to the first member 21 and the second member 22 in a state in which the third insulation slit SL3 is disposed at a different position from at least one of the first insulation slit SL1r and the second insulation slit SL2r in the rotation direction θ. For example, in the embodiment, the third rotor core R3 is integrally connected to the first member 21 and the second member 22 in a state in which the third insulation slit SL3 is disposed at a different position from the second insulation slit SL2r in the rotation direction θ. According to the above-mentioned configuration, a decrease in stiffness of the rotor core RU around the second insulation slit SL2r is further suppressed, and higher stiffness as a whole can be maintained.

In addition, when seen from another viewpoint, in the embodiment, the third rotor core R3 is integrally connected to the first member 21 and the second member 22 in a state in which the third insulation slit SL3 is disposed at substantially the same position as at least one of the first insulation slit SL1r and the second insulation slit SL2r in the rotation direction θ. For example, in the embodiment, the third rotor core R3 is integrally connected to the first member 21 and the second member 22 in a state in which the third insulation slit SL3 is disposed at substantially the same position as the first insulation slit SL1r in the rotation direction θ. According to the above-mentioned configuration, the insulating layer 26 can be omitted at the boundary between the third stator core S3 and the first member 21. Accordingly, the insulating sheet or the insulation processing can be reduced, and reduction in manufacturing cost can be achieved.

In the embodiment, the third stator core S3 is divided into the first member 81 and the second member 82 in the rotation direction θ. In addition, the third stator core S3 includes connecting sections 85 and 86 to which the first member 81 and the second member 82 are connected, and an insulating layer 76 configured to electrically insulate the first member 81 and the second member 82 from each other provided in the connecting sections 85 and 86. Then, the third stator core S3 is integrally connected to the first member 71 and the second member 72 in a state in which the connecting sections 85 and 86 are disposed at substantially the same position as at least one of the first insulation slit SL1 and the second insulation slit SL2s in the rotation direction θ. According to the above-mentioned configuration, an electrical path of a circulating current flowing from the first member 71 or the second member 72 while bypassing the third stator core S3 can be blocked. Accordingly, generation of the circulating current in the first member 71 and the second member 72 can be more securely suppressed.

In the embodiment, the rotor core RU and the stator core SU include the first fixing member 41 and the second fixing member 42 configured to fix the first members 21 and 71 and the second members 22 and 72. The first fixing member 41 and the second fixing member 42 are arranged in the rotation direction θ. The first insulation slits SL1r and SL1s are formed between the first fixing member 41 and the second fixing member 42 in the rotation direction θ. According to the above-mentioned configuration, surroundings of the first insulation slits SL1r and SL1s are relatively strongly supported by the two fixing members 41 and 42 disposed at both sides of the first insulation slits SL1r and SL1s. For this reason, stiffness around the first insulation slits SL1r and SL1s can be more highly maintained.

In the embodiment, the second insulation slits SL2r and SL2s are formed in a region which is different form a region between the first fixing member 41 and the second fixing member 42 in the rotation direction θ. In other words, the first fixing member 41 and the second fixing member 42 are connected by a portion of the second members 22 and 72 in which no slit is formed (i.e., a portion that is not divided by the slit). According to the above-mentioned configuration, surroundings of the first insulation slits SL1r and SL1s are more strongly supported by the two fixing members 41 and 42. For this reason, stiffness around the first insulation slits SL1r and SL1s can be more highly maintained.

In the embodiment, the rotating electrical machine 1 further includes the insulating layer 78 configured to electrically insulate the boundary between the basic unit 4 and the spacer 52. According to the above-mentioned configuration, an electrical path of a circulating current flowing from the first member 71 and the second member 72 while bypassing the spacers 52 can be blocked. Accordingly, generation of the circulating current in the first member 71 and the second member 72 can be more reliably suppressed.

(Second Embodiment)

Next, a rotating electrical machine 1 of a second embodiment will be described with reference to FIG. 9 to FIG. 12C. The embodiment is distinguished from the first embodiment in that a third rotor core R3 is constituted by a plurality of members. Further, the configuration not described in the following description is the same as the first embodiment.

Figure 9:
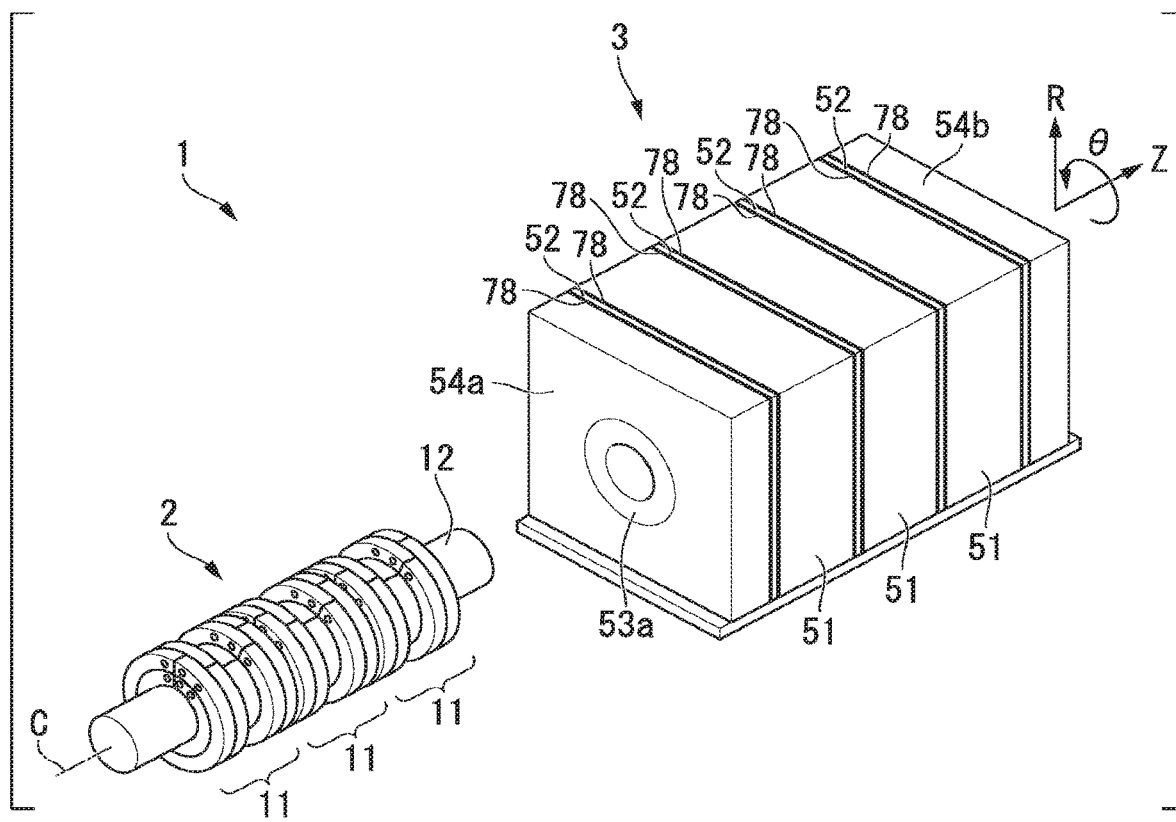
FIG. 9 is a partially exploded perspective view of a rotating electrical machine of a second embodiment.
Figure 10:
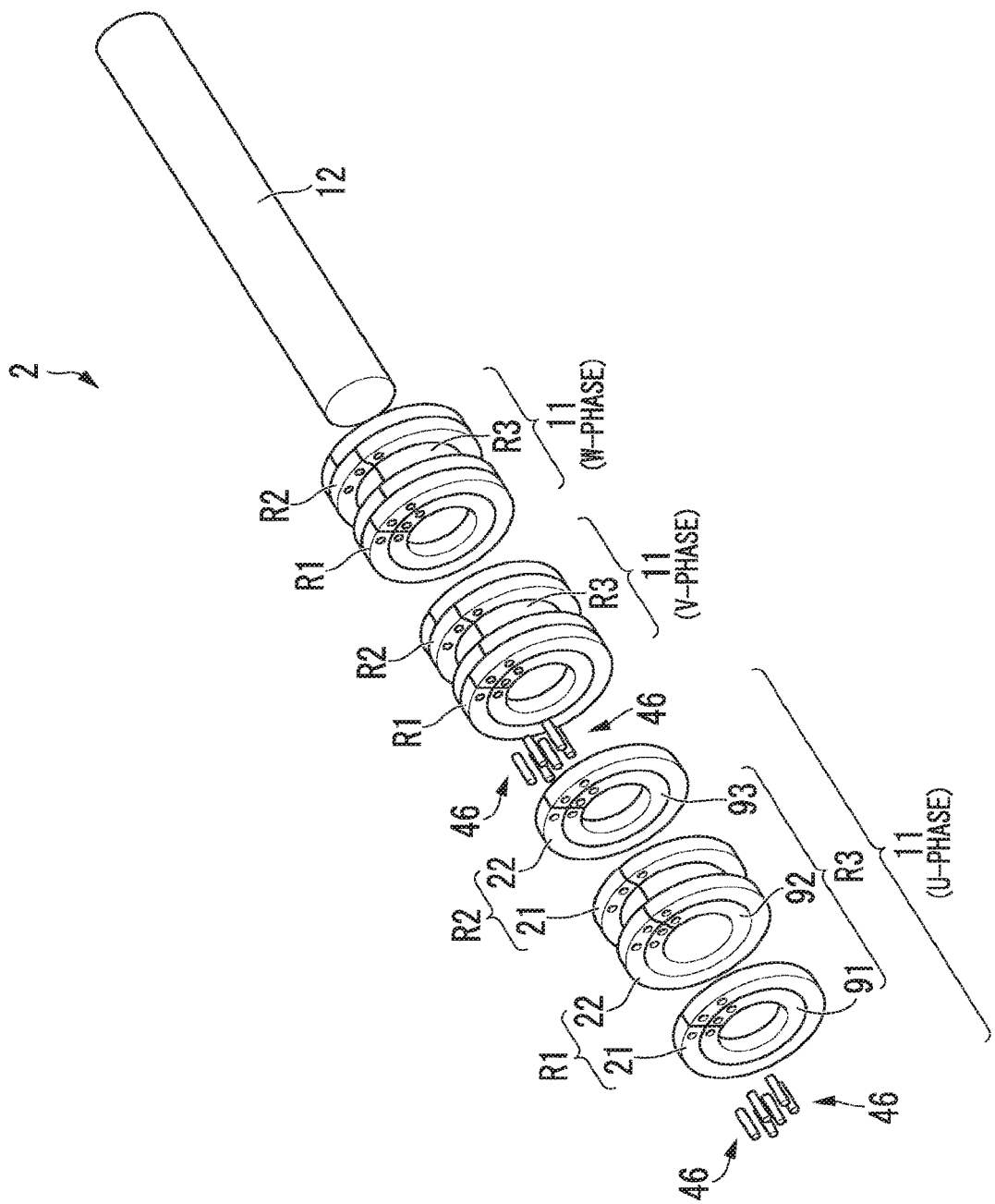
FIG. 10 is a partially exploded perspective view of a rotor of the second embodiment.
Figure 11A:
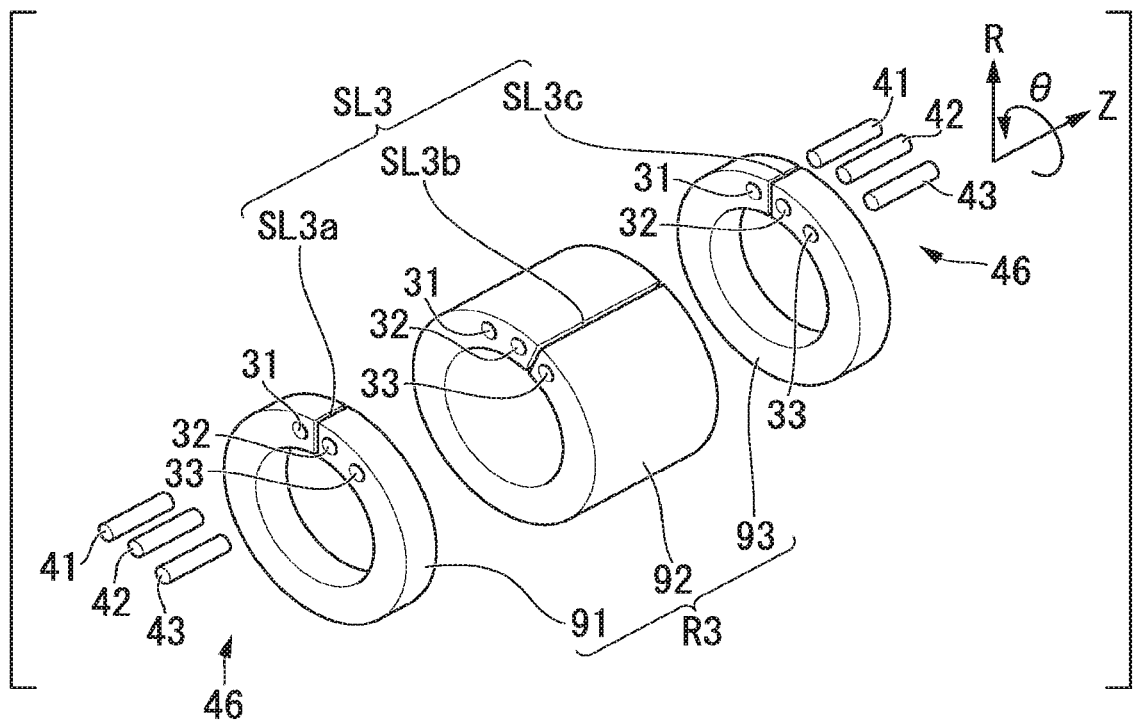
FIG. 11A is an exploded perspective view of a third rotor core of the second embodiment.
Figure 11B:
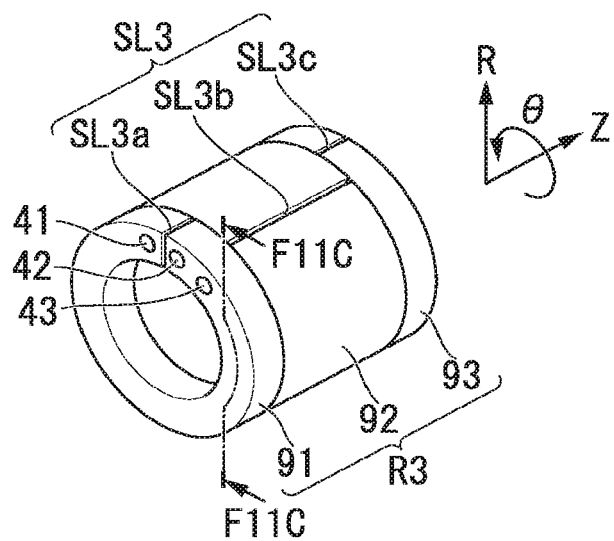
FIG. 11B is a perspective view showing a state after assembly of the third rotor core of the second embodiment.
Figure 11C:
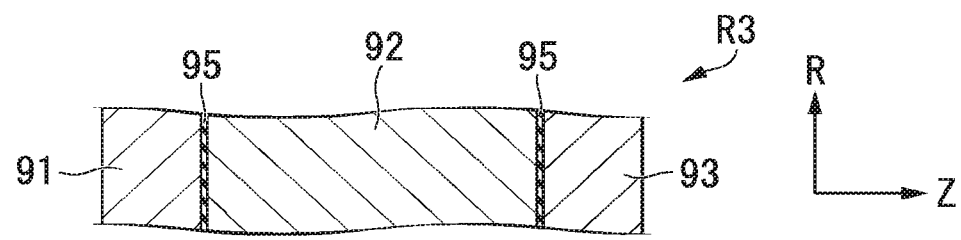
FIG. 11C is a cross-sectional view taken along line F11C-F11C of the third rotor core shown in FIG. 11B.

FIG. 9 is a partially exploded perspective view showing the rotating electrical machine 1 of the embodiment. FIG. 10 is a partially exploded perspective view showing the rotor 2. FIG. 11A is an exploded perspective view showing the third rotor core R3. FIG. 11B is a perspective view showing a state after assembly of the third rotor core R1 FIG. 11C is a cross-sectional view taken along line F11C-F11C of the third rotor core R3 shown in FIG. 11B.

As shown in FIG. 11A, the third rotor core R3 of the embodiment is divided into a plurality of members in the axial direction Z. For example, the third rotor core R3 is divided into a first member 91, a second member 92, and a third member 93 in the axial direction Z. The first member 91, the second member 92, and the third member 93 are formed in annular shapes in the rotation direction θ (i.e., annular shapes about the rotary center axis C), and have substantially the same outer diameters. The first member 91, the second member 92 and, the third member 93 overlap each other in the axial direction Z. A thickness in the axial direction Z of the first member 91 is substantially equal to a thickness in the axial direction Z of the first member 21 of the first rotor core R1. A thickness in the axial direction Z of the third member 93 is substantially equal to a thickness in the axial direction Z of the second member 22 of the second rotor core R2. The third insulation slit SL3 of the embodiment has a first portion SL3a formed at the first member 91, a second portion SL3b formed at the second member 92, and a third portion SL3c formed at the third member 93. Each of the first portion SL3a, the second portion SL3b and the third portion SL3c is formed in a slit shape in the axial direction Z.

Specifically, the first portion SL3a of the third insulation slit SL3 passes through the first member 91 in the axial direction Z. The first portion SL3a is formed at a portion of the first member 91 in the rotation direction θ. In addition, the first portion SL3a passes through an inner circumferential surface to an outer circumferential surface of the first member 91 in the radial direction R. The first portion SL3a electrically cuts (i.e., blocks) an annular electrical path formed in the first member 91 in the rotation direction θ.

Similarly, the second portion SL3b of the third insulation slit SL3 passes through the second member 92 in the axial direction Z. The third portion SL3c of the third insulation slit SL3 passes through the third member 93 in the axial direction Z. Further, detailed description of the second portion SL3b and the third portion SL3c of the third insulation slit SL3 is substantially the same as that of the first portion SL3a of the third insulation slit SL3. That is, in the detailed description of the second portion SL3b and the third portion SL3c of the third insulation slit SL3, and in the description related to the first portion SL3a of the third insulation slit SL3, "the first portion SL3a" may be substituted with "the second portion SL3b" or "the third portion SL3c," and "the first member 91" may be substituted with "the second member 92" or "the third member 93."

Then, as shown in FIG. 11B, the first member 91 and the second member 92 are integrally connected in a state in which the first portion SL3a and the second portion SL3b of the third insulation slit SL3 are disposed at different positions in the rotation direction θ (i.e., positions deviated from each other). Similarly, the second member 92 and the third member 93 are integrally connected in a state in which the second portion SL3b of and the third portion SL3c of the third insulation slit SL3 are disposed at different positions in the rotation direction θ (i.e., positions that are deviated from each other).

As shown in FIG. 11C, the third rotor core R3 includes a third rotor insulating layer 95 (e.g., an insulating sheet, an insulating layer formed by insulation processing, or the like) provided in a boundary between the first member 91 and the second member 92 and a boundary between the second member 92 and the third member 93. The third rotor insulating layer 95 is disposed between the first member 91 and the second member 92 in the axial direction Z to electrically insulate the boundary between the first member 91 and the second member 92. In addition, the third rotor insulating layer 95 is disposed between the second member 92 and the third member 93 in the axial direction Z to electrically insulate the boundary between the second member 92 and the third member 93.

Next, a position of the third insulation slit SL3 with respect to the first insulation slit SL1r and the second insulation slit SL2r will be described.

Figure 12A:
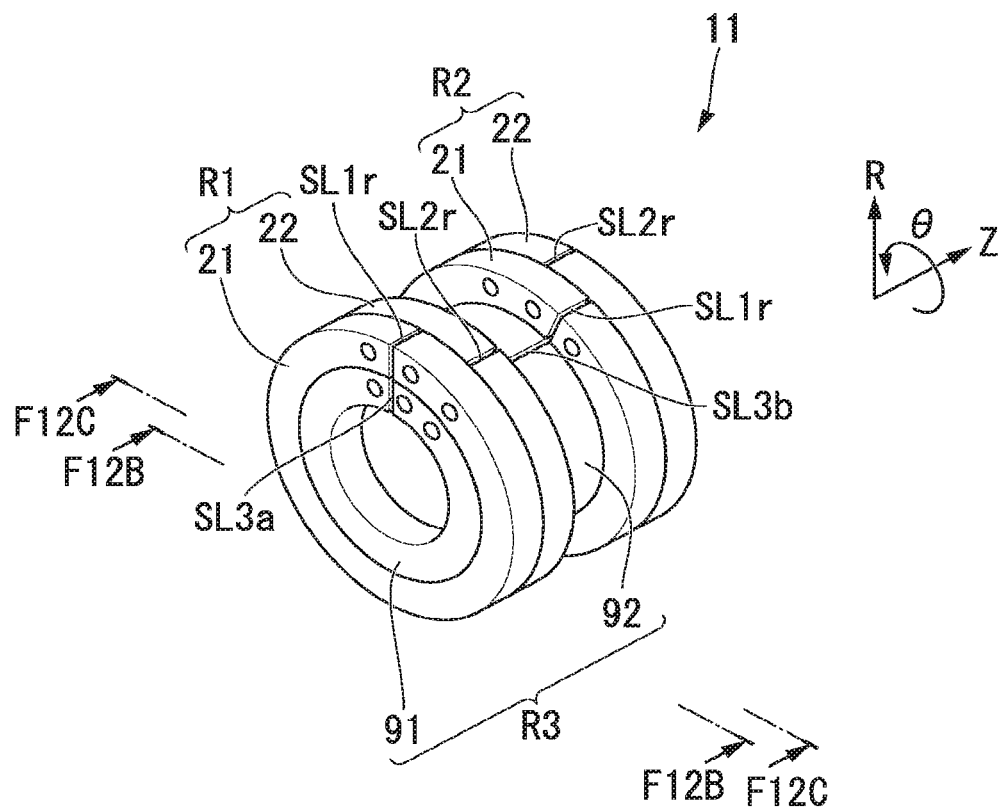
FIG. 12A is a perspective view showing a state after assembly of the rotor of the second embodiment.
Figure 12B:
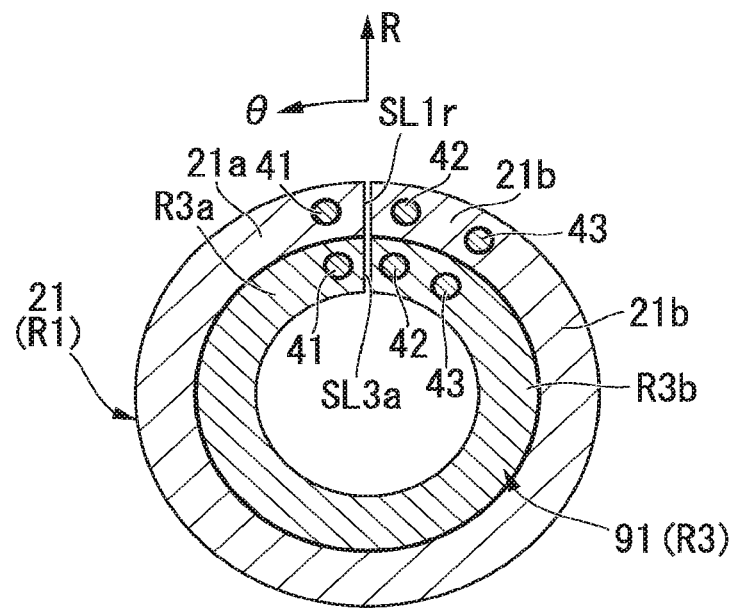
FIG. 12B is a cross-sectional view taken along line F12B-F12B of the rotor shown in FIG. 12A.
Figure 12C:
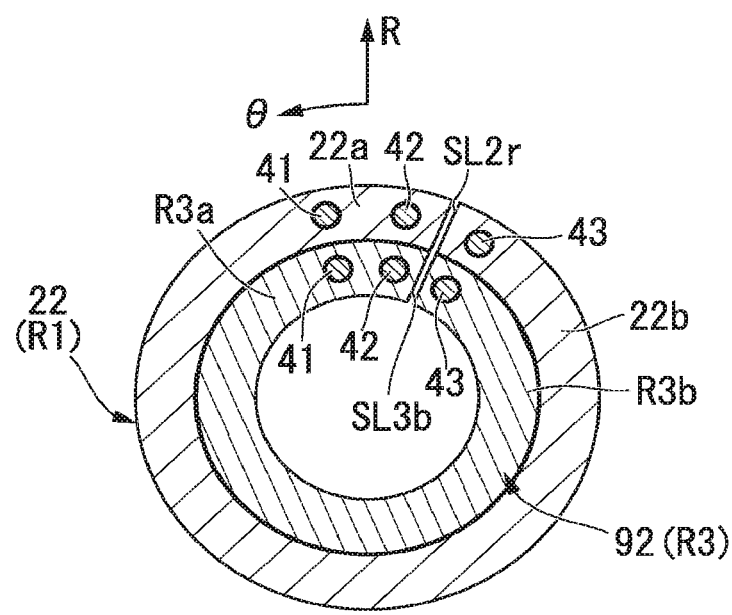
FIG. 12C is a cross-sectional view taken along line F12C-F12C of the rotor shown in FIG. 12A.

FIG. 12A is a perspective view showing a state after assembly of the rotor 11. FIG. 12B is a cross-sectional view taken along line F12B-F12B of the rotor 11 shown in FIG. 12A. FIG. 12C is a cross-sectional view taken along line F12C-F12C of the rotor 11 shown in FIG. 12A.

As shown in FIG. 12A, the first member 21 of the first rotor core R1 is attached to the first member 91 of the third rotor core R3. The second member 22 of the first rotor core R1 and the first member 21 of the second rotor core R2 are attached to the second member 92 of the third rotor core R3. The second member 22 of the second rotor core R2 is attached to the third member 93 of the third rotor core R3.

Then, as shown in FIG. 12A and FIG. 12B, the first portion SL3a of the third insulation slit SL3 is disposed at a position corresponding to the first insulation slit SL1r of the first rotor core R1 in the rotation direction θ (i.e., substantially the same position in the rotation direction θ). That is, the first portion SL3a of the third insulation slit SL3 faces the first insulation slit SL1r of the first rotor core R1 in the radial direction R. Accordingly, an electrical path of a circulating current bypassing the third rotor core R3 from the first member 21 of the first rotor core R1 is blocked.

Similarly, as shown in FIG. 12A and FIG. 12C, the second portion SL3b of the third insulation slit SL3 is disposed at positions corresponding to the second insulation slit SL2r of the first rotor core R1 and the first insulation slit SL1r of the second rotor core R2 in the rotation direction θ (i.e., substantially the same positions in the rotation direction θ). That is, the second portion SL3b of the third insulation slit SL3 faces the second insulation slit SL2r of the first rotor core R1 and the first insulation slit SL1r of the second rotor core R2 in the radial direction R. Accordingly, an electrical path of a circulating current bypassing the third rotor core R3 from the second member 22 of the first rotor core R1 and the first member 21 of the second rotor core R2 is blocked.

In addition, the third portion SL3c of the third insulation slit SL3 is disposed at a position corresponding to the second insulation slit SL2r of the second rotor core R2 in the rotation direction θ (i.e., substantially the same position in the rotation direction θ). That is, the third portion SL3c of the third insulation slit SL3 faces the second insulation slit SL2r of the second rotor core R2 in the radial direction R. Accordingly, an electrical path of a circulating current bypassing the third rotor core R3 from the second member 22 of the second rotor core R2 is blocked.

According to the above-mentioned configuration, similar to the first embodiment, high stiffness can be maintained while improving performance of the rotating electrical machine 1.

In addition, in the embodiment, the third insulation slit SL3 has a first portion SL3a formed at substantially the same position as the first insulation slit SL1r in the rotation direction θ, and a second portion SL3b formed at substantially the same position as the second insulation slit SL2r in the rotation direction θ. According to the above-mentioned configuration, the insulating layer 26 can be omitted at both of a boundary between the third stator core S3 and the first member 21 and a boundary between the third stator core S3 and the second member 22. Accordingly, since the insulating sheet or the insulation processing can be further reduced, reduction in manufacturing cost can be further achieved.

(Third Embodiment)

Next, a rotating electrical machine 1 of a third embodiment will be described with reference to FIG. 13 to FIG. 18B. The embodiment is distinguished from the second embodiment in that the stator core SU is formed in an annular shape. Further, the configuration not described in the following description is the same as that of the second embodiment.

Figure 13:
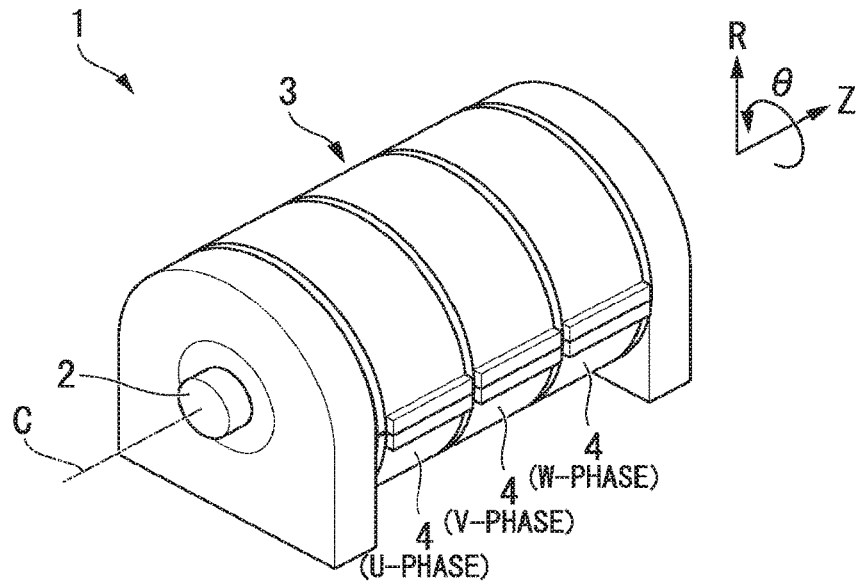
FIG. 13 is a perspective view showing a rotating electrical machine of a third embodiment.
Figure 14:
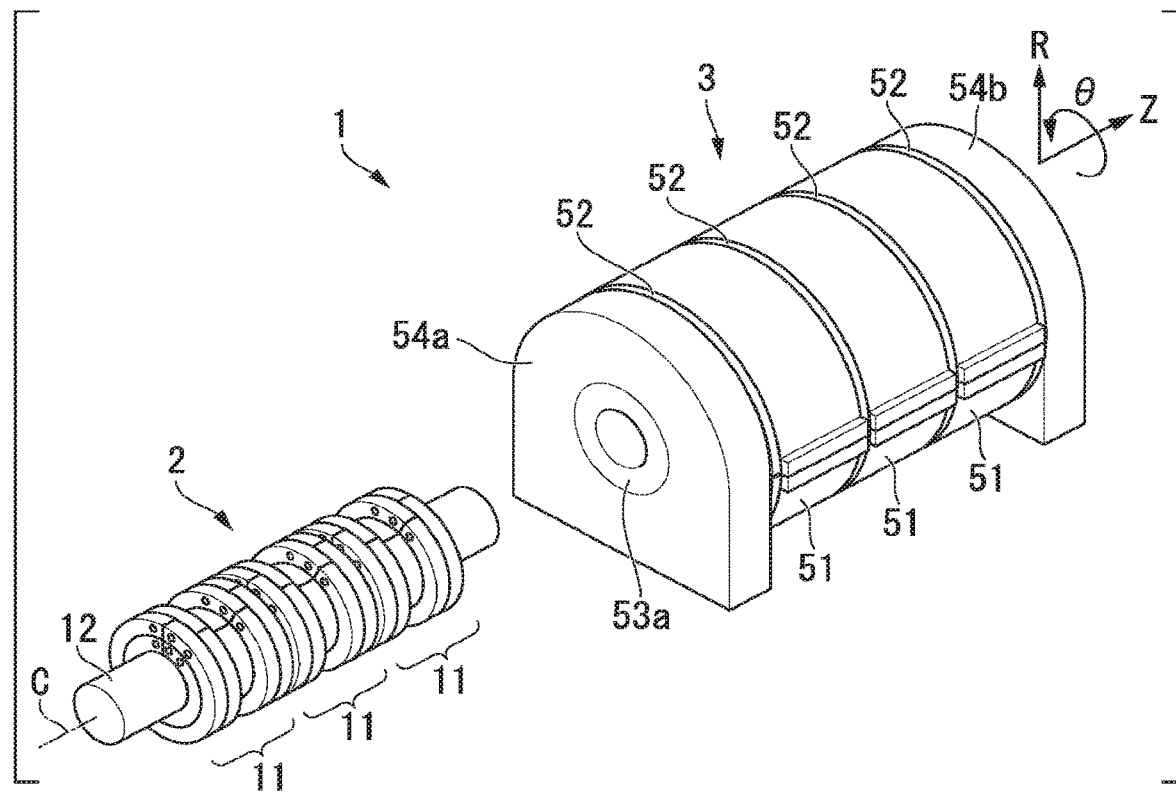
FIG. 14 is a partially exploded perspective view showing the rotating electrical machine of the third embodiment.
Figure 15:
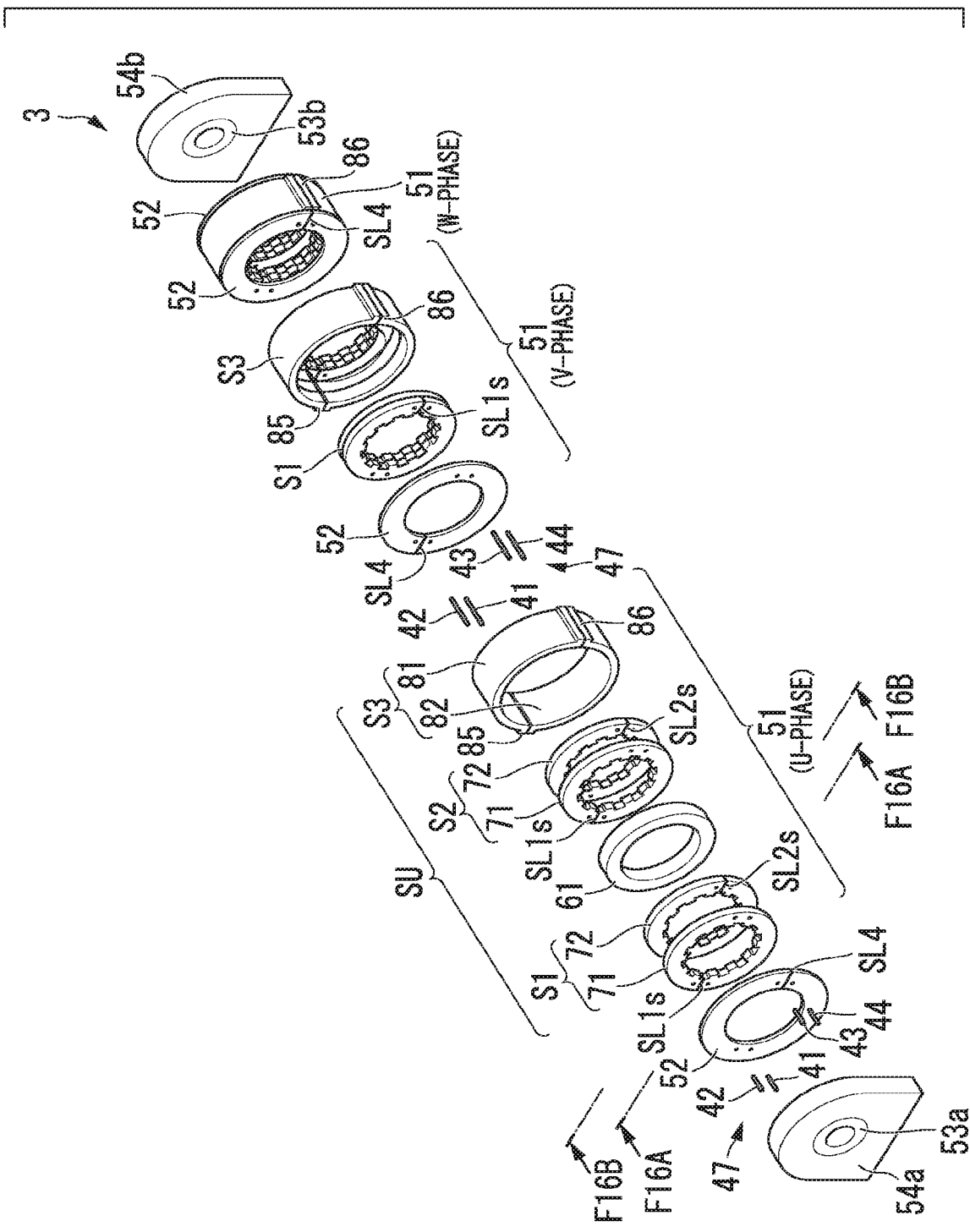
FIG. 15 is a partially exploded perspective view showing a stator of the third embodiment.
Figure 16A:
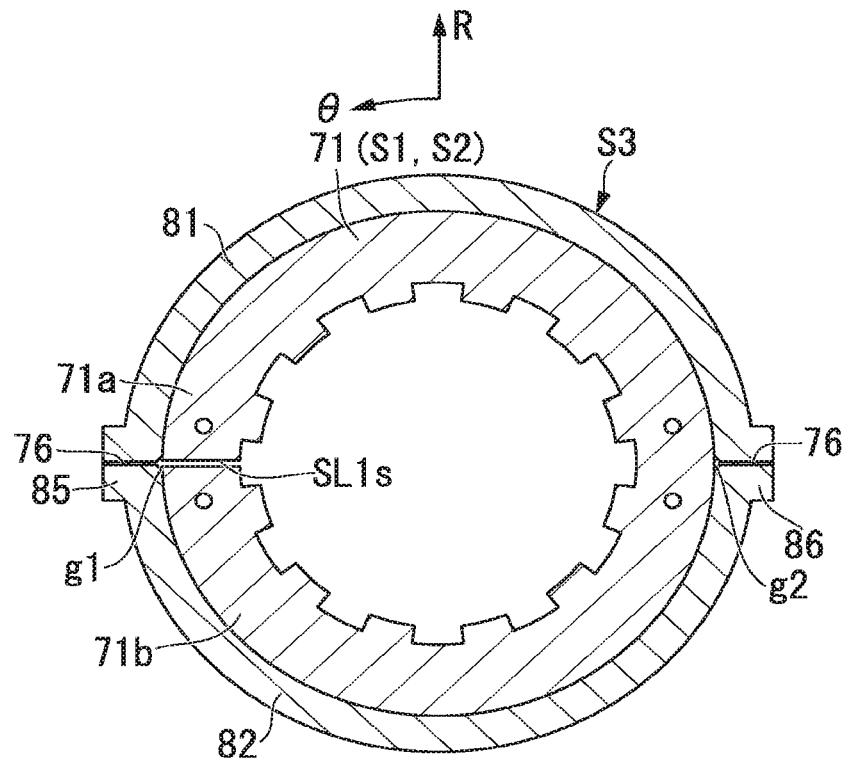
FIG. 16A is a cross-sectional view taken along line F16A-F16A of a stator core shown in FIG. 15.
Figure 16B:
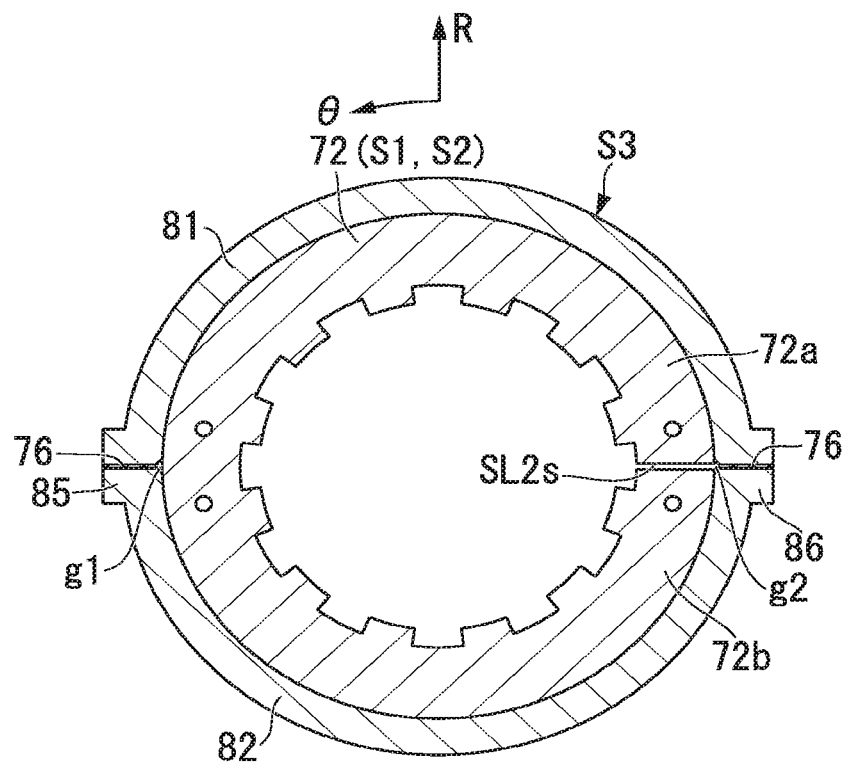
FIG. 16B is a cross-sectional view taken along line F16B-F16B of the stator core shown in FIG. 15.

FIG. 13 is a perspective view showing the rotating electrical machine 1 of the embodiment as a whole. FIG. 14 is a partially exploded perspective view showing the rotating electrical machine 1. FIG. 15 is a partially exploded perspective view showing the rotor 2. FIG. 16A is a cross-sectional view taken along line F16A-F16A of the armature 51 shown in FIG. 15. FIG. 16B is a cross-sectional view taken along line F16B-F16B of the armature 51 shown in FIG. 15.

As shown in FIG. 15, the first stator core S1, the second stator core S2, and the third stator core S3 of the embodiment are formed in circular-annular shapes in the rotation direction θ (i.e., a circular-annular shape about the rotary center axis C). Each of the first stator core S1 and the second stator core S2 includes a first member 71 and a second member 72, like the first embodiment. However, in the embodiment, each of the first member 71 and the second member 72 is formed in an annular shape in the rotation direction θ (i.e., an annular shape about the rotary center axis C). In the embodiment, the first member 71 and the second member 72 are integrally connected in a state in which the first insulation slit SL1s and the second insulation slit SL2s are disposed at positions differing by 180 degrees in the rotation direction θ.

As shown in FIG. 16A and FIG. 16B, the third stator core S3 is divided into a first member 81 and a second member 82 in the rotation direction θ. The first member 81 and the second member 82 are formed in a shape in which the third stator core S3 having a circular-annular shape is divided into two parts. In addition, in the embodiment, the first connecting section 85 and the second connecting section 86 are disposed at positions differing by 180 degrees in the rotation direction θ.

The third stator core S3 is integrally connected to the first member 71 and the second member 72 in a state in which the first connecting section 85 (i.e., the second stator insulating layer 76) is disposed at a position corresponding to the first insulation slit SL1s in the rotation direction θ (i.e., substantially the same position in the rotation direction θ). In the embodiment, a first gap g1 having a triangular shape and surrounded by the first member 71, the first member 81 and the second member 82 is formed at the first connecting section 85. The first insulation slit SL1s communicates with the first gap g1. Since the first gap g1 is provided, the first portion 71a of the first member 71 is electrically insulated from the second member 82. In addition, the second portion 71b of the first member 71 is electrically insulated from the first member 81.

Similarly, the third stator core S3 is integrally connected to the first member 71 and the second member 72 in a state in which the second connecting section 86 (i.e., the second stator insulating layer 76) is disposed at a position corresponding to the second insulation slit SL2s in the rotation direction θ (i.e., substantially the same position in the rotation direction θ). In the embodiment, a second gap g2 having a triangular shape and surrounded by the second member 72, the first member 81 and the second member 82 is formed at the second connecting section 86. The second insulation slit SL2s communicates with the second gap g2. Since the second gap g2 is provided, the first portion 72a of the second member 72 is electrically insulated from the second member 82. In addition, the second portion 72b of the second member 72 is electrically insulated from the first member 81.

Next, the spacer 52 of the embodiment will be described.

Figure 17A:
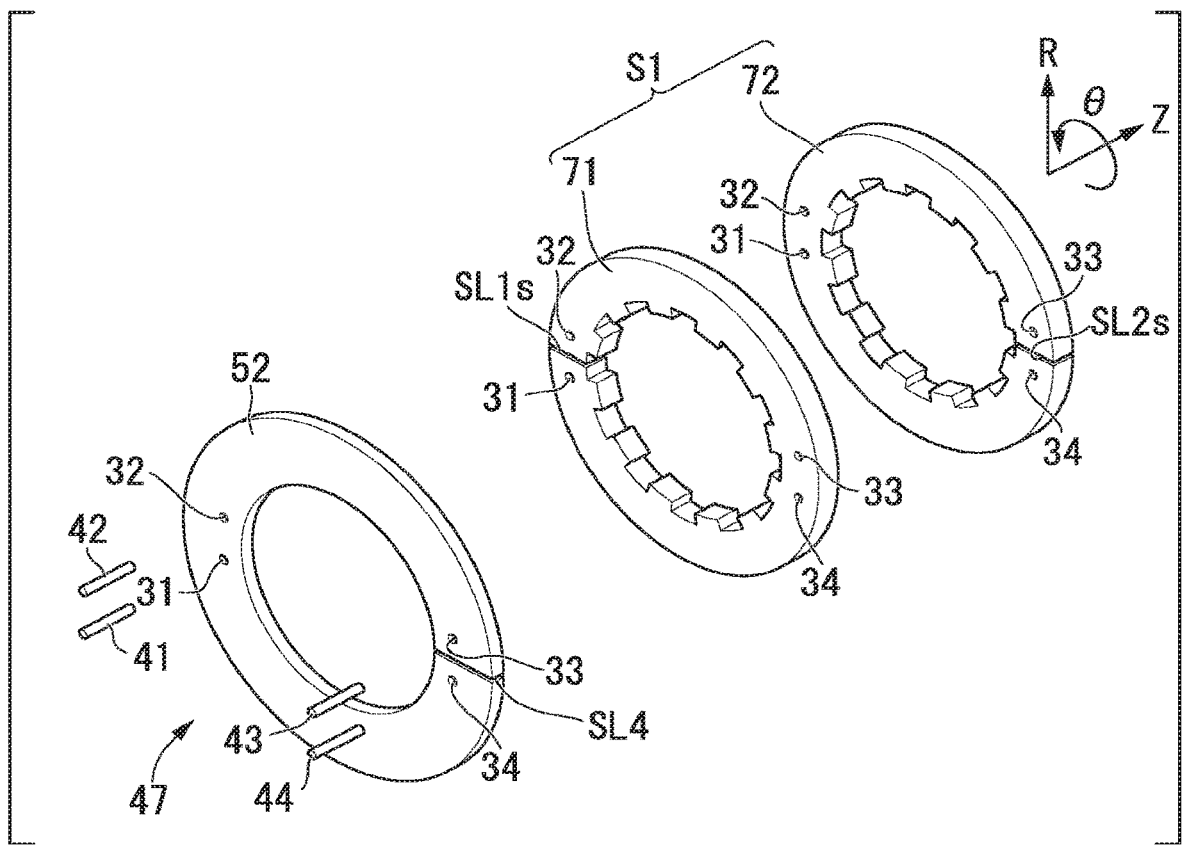
FIG. 17A is an exploded perspective view showing a spacer and a first stator core of the third embodiment.
Figure 17B:
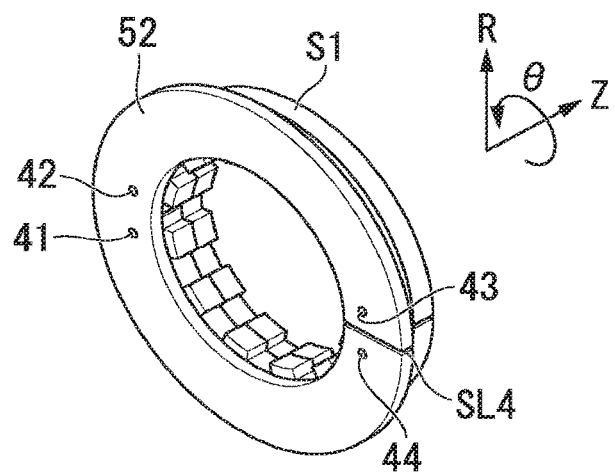
FIG. 17B is a perspective view showing a state in which the spacer and the first stator core of the third embodiment are connected.

FIG. 17A is an exploded perspective view showing the spacer 52 and the first stator core S1 of the embodiment. FIG. 17B is a perspective view showing a state in which the spacer 52 and the first stator core S1 are connected.

As shown in FIG. 17A, the spacer 52 of the embodiment is formed in a circular-annular shape in the rotation direction θ (i.e., a circular-annular shape about the rotary center axis C). In addition, the spacer 52 of the embodiment has a slit-shaped fourth insulation section SL4 (hereinafter referred to as the fourth insulation slit SL4) formed in the axial direction Z. The fourth insulation slit SL4 of the embodiment passes through the spacer 52 in the axial direction Z. For example, the fourth insulation slit SL4 has a through-groove passing through the spacer 52 in the axial direction Z, and the through-groove is filled with an insulator which may include air or a vacuum. The fourth insulation slit SL4 is formed in a portion of the spacer 52 in the rotation direction θ. In addition, the fourth insulation slit SL4 passes from an inner circumferential surface to an outer circumferential surface of the spacer 52 in the radial direction R. The fourth insulation slit SL4 electrically cuts (i.e., blocks) an annular electrical path formed in the spacer 52 in the rotation direction θ.

Then, as shown in FIG. 17A and FIG. 17B, the spacer 52 and the first stator core S1 are integrally connected in a state in which the fourth insulation slit SL4 and the first insulation slit SL1s are disposed at different positions in the rotation direction θ (e.g., positions differing by 180 degrees). In other words, the fourth insulation slit SL4 and the first insulation slit SL1s do not face each other in the axial direction Z. In addition, when seen from another viewpoint, the fourth insulation slit SL4 faces a region of the first stator core S1 in which no slit is formed. The first insulation slit SL1s faces a region of the spacer 52 in which no slit is formed.

Figure 18A:
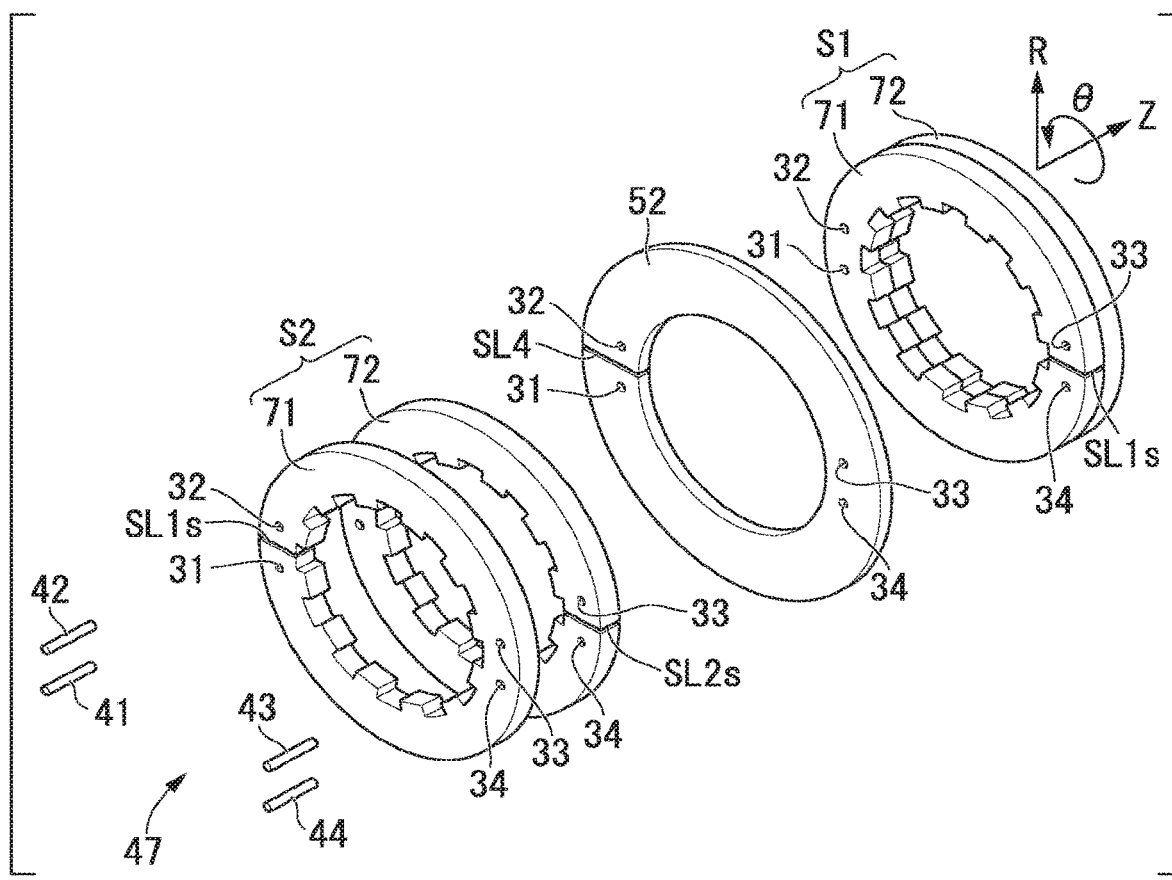
FIG. 18A is an exploded perspective view showing a second stator core of a U phase, a spacer and a first stator core of a V phase of the third embodiment.
Figure 18B:
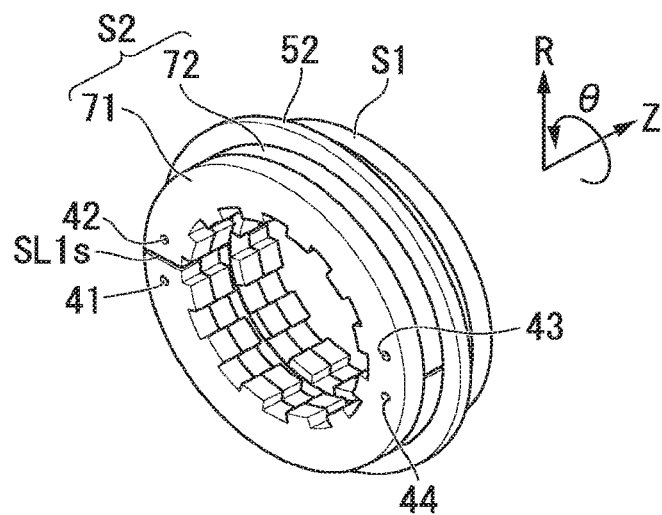
FIG. 18B is a perspective view showing a state in which the second stator core of the U phase, the spacer and the first stator core of the V phase of the third embodiment are assembled.

FIG. 18A is an exploded perspective view showing the second stator core S2 of a U phase, the spacer 52, and the first stator core S1 of a V phase. FIG. 18B is a perspective view showing a state in which the second stator core S2 of the U phase, the spacer 52, and the first stator core S1 of the V phase are assembled.

As shown in FIG. 18A and FIG. 18B, the first member 71 of the U phase, the second member 72 of the U phase, the spacer 52, the first member 71 of the V phase and the second member 72 of the V phase sequentially arranged in the axial direction Z are disposed such that the first insulation slit SL1s, the second insulation slit SL2s and the fourth insulation slit SL4 are alternately deviated at positions differing by 180 degrees in the rotation direction θ. That is, the first insulation slit SL1s of the first member 71 of the U phase, the second insulation slit SL2s of the second member 72 of the U phase, the fourth insulation slit SL4 of the spacer 52, the first insulation slit SL1s of the first member 71 of the V phase, and the second insulation slit SL2s of the second member 72 of the V phase are disposed, for example, in sequence of left, right, left, right and left from the second stator core S2 of the U phase toward the first stator core S1 of the V phase.

According to the above-mentioned configuration, like the first embodiment, high stiffness can be maintained while improving performance of the rotating electrical machine 1.

In addition, in the embodiment, the spacer 52 and the first stator core S1 are integrally connected in a state in which the fourth insulation slit SL4 and the first insulation slit SL1s are disposed at different positions in the rotation direction θ. According to the above-mentioned configuration, a decrease in stiffness of the rotating electrical machine 1 around the first insulation slit SL1s can be further suppressed, and higher stiffness as a whole can be maintained.

In addition, in the embodiment, as shown in FIG. 15, the spacer 52 is integrally connected to the third stator core S3 in a state in which the fourth insulation slit SL4 is disposed at a position corresponding to at least one of the first connecting section 85 and the second connecting section 86 in the rotation direction θ (i.e., substantially the same position in the rotation direction θ). That is, the fourth insulation slit SL4 faces at least one of the first connecting section 85 and the second connecting section 86 in the axial direction Z. According to the above-mentioned configuration, an insulating layer provided in the boundary between the spacer 52 and the third stator core S3 can be omitted. Accordingly, the insulating sheet or the insulation processing can be reduced, and reduction in manufacturing cost can be achieved.

Figure 19:
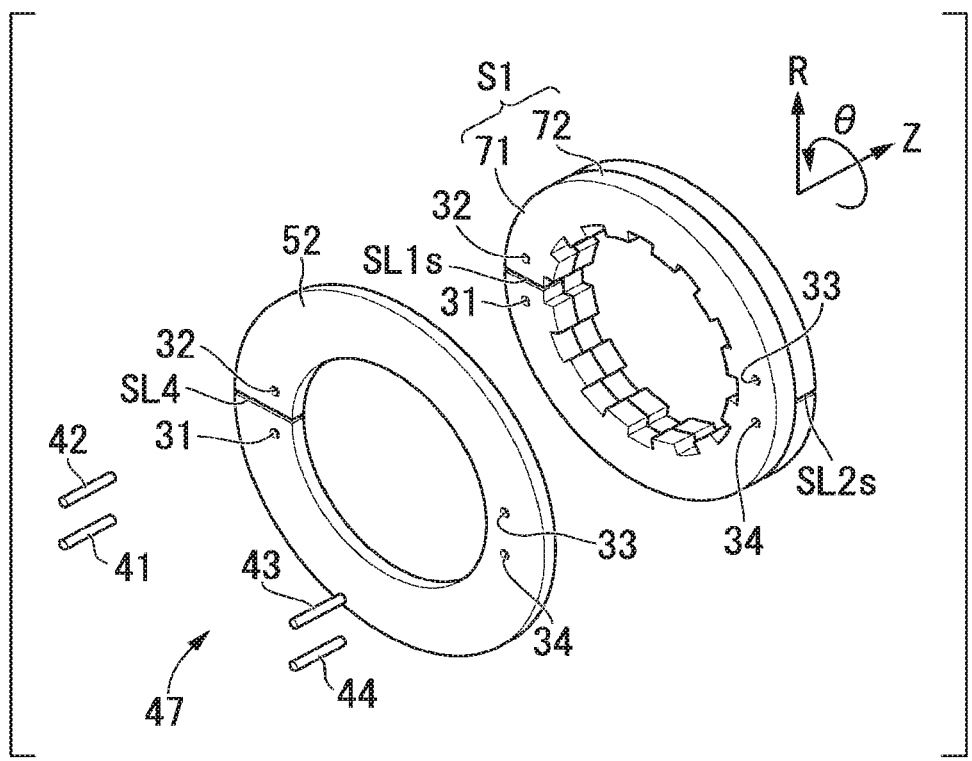
FIG. 19 is a perspective view showing a variant of the rotating electrical machine of the third embodiment.

Here, FIG. 19 is a perspective view showing a variant of the embodiment.

As shown in FIG. 19, in the variant, the spacer 52 and the first stator core S1 are integrally connected in a state in which the fourth insulation slit SL4 and the first insulation slit SL1s are disposed at positions corresponding to each other in the rotation direction θ.

That is, the spacer 52 is integrally connected to the first member 71 and the second member 72 in a state in which the fourth insulation slit SL4 is disposed at a position corresponding to at least one of the first insulation slit SL1s and the second insulation slit SL2s in the rotation direction θ (i.e., substantially the same position in the rotation direction θ). According to the above-mentioned configuration, the insulating layer 78 provided in the boundary between the spacer 52 and the first stator core S1 or the boundary between the spacer 52 and the second stator core S2 can be omitted. Accordingly, the insulating sheet or the insulation processing can be reduced, and reduction in manufacturing cost can be achieved.

Next, fourth to sixth embodiments will be described. The fourth to sixth embodiments are use examples of the rotating electrical machine 1 described in the first to third embodiments.

(Fourth Embodiment)

Figure 20:
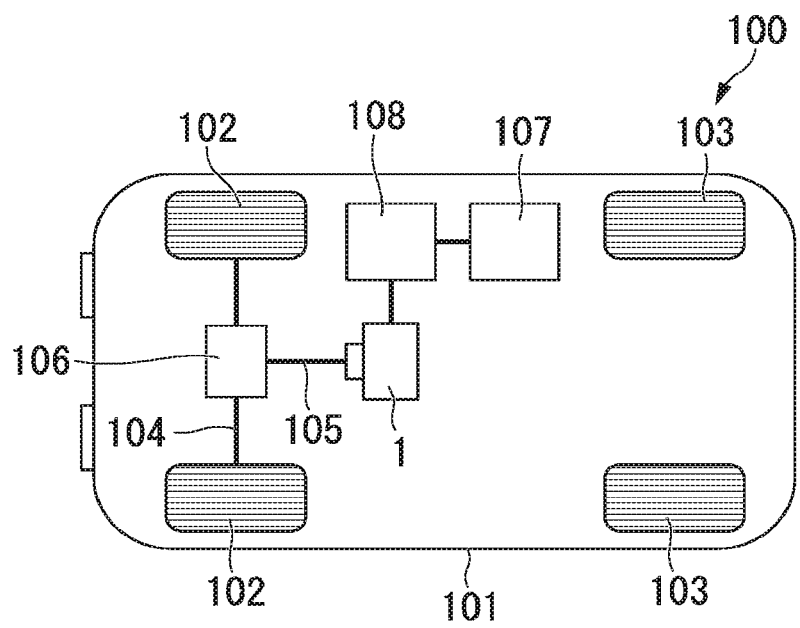
FIG. 20 is a schematic view of a electric vehicle of a fourth embodiment.

FIG. 20 is a schematic view showing an electric vehicle 100 of a fourth embodiment.

As shown in FIG. 20, the electric vehicle 100 is, for example, an electric automobile. The electric vehicle 100 includes a vehicle body 101, two front wheels 102, two rear wheels 103, driving shafts 104 and 105, a differential gear 106, a battery 107, a rotating electrical machine 1 and a control device 108. The front wheels 102 are connected to the shaft 12 of the rotating electrical machine 1 via the driving shafts 104 and 105 and the differential gear 106. The battery 107 supplies power to the rotating electrical machine 1. The rotating electrical machine 1 outputs a driving force that moves the electric vehicle 100.

Figure 21:
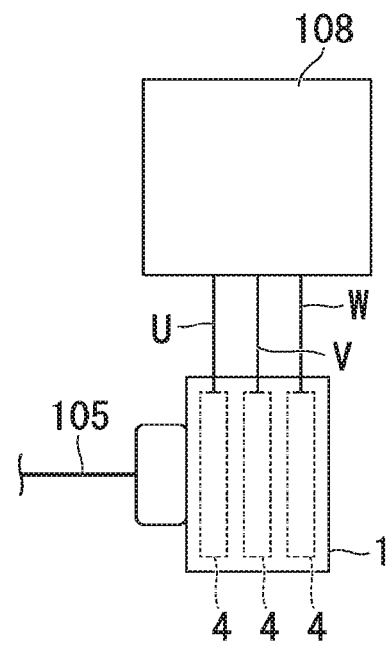
FIG. 21 is a partially enlarged view of the electric vehicle of the fourth embodiment.

FIG. 21 is an enlarged view showing the electric vehicle 100.

As shown in FIG. 21, power lines of U, V and W of the control device 108 are connected to the windings 61 of the armatures 51 of the rotating electrical machine 1. 3-phase currents having a phase difference of 120 degrees are supplied from the control device 108 to the windings 61 of the armatures 51 of the rotating electrical machine 1.

(Fifth Embodiment)

Figure 22:
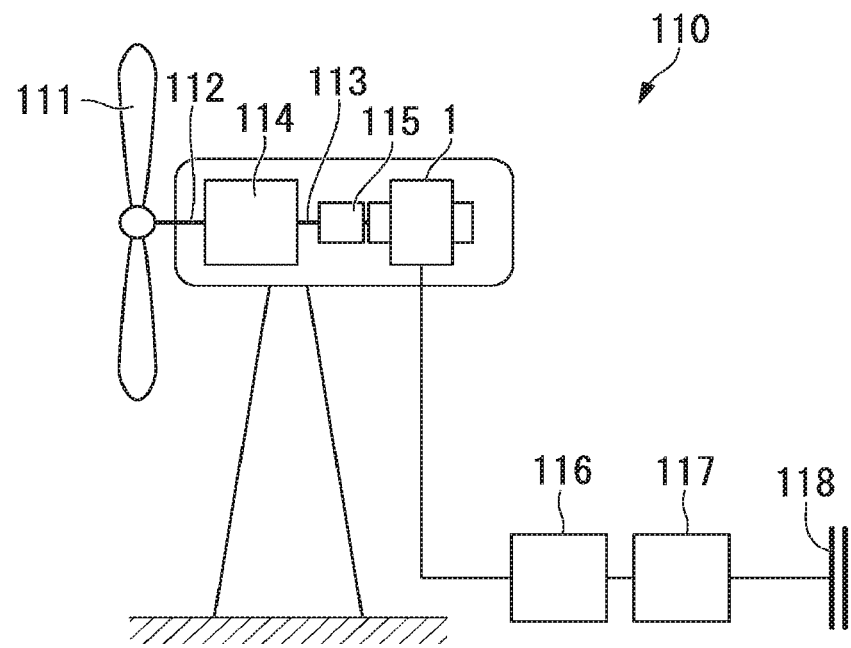
FIG. 22 is a schematic view of a wind energy generator of a fifth embodiment.

FIG. 22 is a schematic view showing a wind energy generator 110 of a fifth embodiment.

As shown in FIG. 22, the wind energy generator 110 includes a blade 111, rotary shafts 112 and 113, a speed-increasing apparatus 114, a shaft joint 115, a rotating electrical machine 1, a transformer 116, a system protection device 117 and a power system 118. When the blade 111 is rotated by wind power, torque is transmitted to the speed-increasing apparatus 114 via the rotary shaft 112. Output torque of the speed-increasing apparatus 114 is input to the rotating electrical machine 1 via the rotary shaft 113 and the shaft joint 115. The rotating electrical machine 1 of the embodiment is a generator, and performs a power generation operation using the torque input from the shaft joint 115. Power generated by the rotating electrical machine 1 is output to the power system 118 via the transformer 116 and the system protection device 117. Further, the rotating electrical machine 1 is not limited to the wind energy generator 110 but may be widely used in various kinds of generators such as hydraulic generating equipment or the like.

(Sixth Embodiment)

Figure 23:
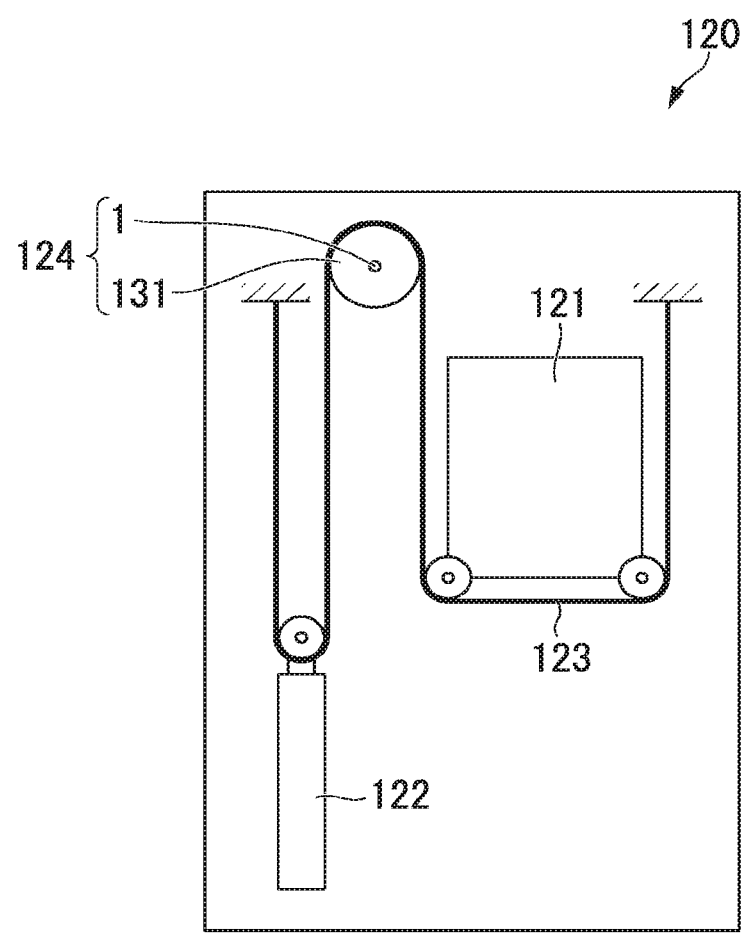
FIG. 23 is a schematic view of an elevator of a sixth embodiment.

FIG. 23 is a schematic view showing an elevator 120 of a sixth embodiment.

As shown in FIG. 23, the elevator 120 includes a elevator cage 121, a counter weight 122, a rope 123 and a hoisting machine 124.

The elevator cage 121 is disposed at an elevation path and can be elevated along a guide rail (not shown). One end of the rope 123 is connected to the elevator cage 121. The counter weight 122 is disposed at the elevation path and can be elevated along a separate guide rail (not shown). The other end of the rope 123 is connected to the counter weight 122.

The hoisting machine 124 includes a sheave 131 and a rotating electrical machine 1. The rope 123 is wound on the sheave 131. The rotating electrical machine 1 drives the sheave 131. The rotating electrical machine 1 elevates the elevator cage 121 and the counter weight 122 by rotating the sheave 131.

According to the above-mentioned configuration, since the hoisting machine 124 and the elevator 120 include the above-mentioned rotating electrical machine 1, high stiffness can be maintained while improving performance.

Hereinabove, the rotating electrical machine 1, the hoisting machine 124, and the elevator 120 according to the first to sixth embodiments have been described. According to the above-mentioned rotating electrical machine 1, since high stiffness support of the rotor core RU and the stator core SU and reduction in loss of the annular core may become possible, in particular, reduction in vibration and noise can be achieved while realizing rotation performance such as high output, high torque, or the like. For this reason, use as a high torque and high output driving source and use as a large generator in fields in which large torque or output density is required, for example, a wide range of fields such as machine tools, ships, automobiles, robots, or the like, can also be expected.

Further, the configuration of the embodiment is not limited to the above-mentioned example. For example, a configuration in which the first rotor core R1, the second rotor core R2, the first stator core S1, and the second stator core S2 are divided into two parts, the number of stator magnetic poles Ms, and the number of rotor magnetic poles Mr are specifically exemplified, and are not limited thereto. The number of divisions or the number of magnetic poles can be appropriately determined on the basis of various specification values such as torque, a torque ripple, the number of revolutions, or the like which are obtained by a machine of a design target.

For example, the first insulation slits SL1r and SL1s are not limited to the first members 21 and 71 passing in the axial direction Z or the radial direction R. Even when the first insulation slits SL1r and SL1s are formed to the middle of the first members 21 and 71 in at least one of the axial direction Z and the radial direction R, since at least a portion of the circulating current can be reduced, performance of the rotating electrical machine can be improved. Further, this is also the same as in the second insulation slits SL2r and SL2s, the third insulation slit SL3, the fourth insulation slit SL4, or the like.

In the above-mentioned embodiments, the third rotor core R3 includes the slit-shaped third insulation section (i.e., the third insulation slit SL3) which includes the first portion SL3a and the second portion SL3b. In the same way, the third stator core S3 may include a configuration which is the same as a slit-shaped third insulation section (i.e., the third insulation slit SL3) which includes the first portion SL3a and the second portion SL3b in place of the third member (i.e., the first member 81), the fourth member (i.e., the second member 82), the connecting sections 85, 86, and the third insulating layer (i.e., the second stator insulating layer 76).

Further, in the above-mentioned embodiments, the third stator core S3 includes the third member (i.e., the first member 81), the fourth member (i.e., the second member 82), the connecting sections 85, 86, and the third insulating layer (i.e., the second stator insulating layer 76). In the same way, the third rotor core R3 may include configurations which is the same as the third member (i.e., the first member 81), the fourth member (i.e., the second member 82), the connecting sections 85, 86, and the third insulating layer (i.e., the second stator insulating layer 76) in place of the slit-shaped third insulation section (i.e., the third insulation slit SL3) which includes the first portion SL3a and the second portion SL3b.

The rotating electrical machine 1 of the above-mentioned embodiment is not limited to an example serving as a radial gap motor in which normal lines of surfaces opposite to the rotor 11 and the armature 51 are in the radial direction R. The rotating electrical machine 1 of the embodiment may be an axial gap motor in which normal lines of surfaces opposite to the rotor 11 and the armature 51 are in the axial direction Z. In the axial gap motor, the winding 61 is inserted from the radial direction R by the stator core rather than being inserted from the axial direction Z by the stator core. Further, the rotating electrical machine 1 of the embodiment is not limited to an example serving as an inner rotor in which the rotor 11 is disposed inside the armature 51. The rotating electrical machine 1 of the embodiment may be an outer rotor in which the rotor 11 is disposed outside the armature 51.

According to at least one of the above-mentioned embodiments, at least one of a stator core and a rotor core includes a first member and a second member formed in annular shape and overlapping each other in an axial direction of a shaft. The first member has a slit-shaped first insulation section extending in the axial direction. The second member has a slit-shaped second insulation section extending in the axial direction. The first member and the second member are integrally connected in a state in which the first insulation section and the second insulation section are disposed at different positions in a rotation direction of the shaft. According to the above-mentioned configuration, high stiffness can be maintained while improving performance.

In addition, according to still another viewpoint, a rotating electrical machine of the embodiment includes a shaft, an annular winding extending in a rotation direction of the shaft, a stator core including a plurality of stator magnetic poles arranged along the winding, and a rotor core including a plurality of rotor magnetic poles configured to facs the plurality of stator magnetic poles. At least one of the stator core and the rotor core includes a first core and a second core disposed to be separated from each other in an axial direction of the shaft, and a third core facing the first core and the second core in a radial direction of the shaft and configured to magnetically connect the first core and the second core. The first core has a slit-shaped first insulation section extending in the axial direction. The third core has a slit-shaped third insulation section extending in the axial direction. The first core and the third core are integrally connected in a state in which the first insulation section and the third insulation section are disposed at different positions in the rotation direction. According to the above-mentioned configuration, high stiffness can be maintained while improving performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotating electrical machine comprising:
   a shaft;

an annular winding extending in a rotation direction of the shaft;
a stator core comprising a plurality of stator magnetic poles, the plurality of stator magnetic poles being arranged along the winding; and
a rotor core comprising a plurality of rotor magnetic poles, the plurality of rotor magnetic poles being configured to face the plurality of stator magnetic poles, wherein
at least one of the stator core and the rotor core comprises a first member and a second member, a first fixing member, and a second fixing member,
the first member and the second member are formed in annular shape, and the first member and the second member overlap each other in an axial direction of the shaft,
the first fixing member and the second fixing member are arranged in the rotation direction, and the first fixing member and the second fixing member fix the first member and the second member
the first member includes a slit-shaped first insulation section, and the first insulation section extends in the axial direction,
the second member includes a slit-shaped second insulation section, and the second insulation section extends in the axial direction,
the first member and the second member are integrally connected, and the first insulation section and the second insulation section are disposed at different positions in the rotation direction, and
the first insulation section is provided between the first fixing member and the second fixing member in the rotation direction.

2. The rotating electrical machine according to claim 1, wherein
at least one of the stator core and the rotor core comprises a first insulating layer that is a solid insulating layer provided in a boundary between the first member and the second member, and the first insulating layer electrically insulates the boundary between the first member and the second member.

3. The rotating electrical machine according to claim 2, wherein
the first insulating layer is an insulating sheet sandwiched between the first member and the second member.

4. The rotating electrical machine according to claim 2, wherein
the first insulating layer is an insulating layer formed on a surface of at least one of the first member and the second member by insulating processing, and the insulating processing includes at least one of oxidation and coating of an insulating material.

5. The rotating electrical machine according to claim 2, wherein
one of the stator core and the rotor core comprises a first core, a second core, and a third core, the third core magnetically connecting the first core and the second core,
one of the first core and the second core comprises the first member, the second member, and the first insulating layer.

6. The rotating electrical machine according to claim 1, wherein
at least one of the stator core and the rotor core comprises a first core, a second core, and a third core,
the first core and the second core are separated from each other in the axial direction,
the third core faces the first core and the second core in the radial direction, and the third core magnetically connects the first core and the second core, and
at least one of the first core and the second core comprises the first member and the second member, and at least a part of the third core is electrically insulated from at least one of the first member and the second member.

7. The rotating electrical machine according to claim 6, wherein
at least one of the stator core and the rotor core comprises a second insulating layer, the second insulating layer is provided in at least one of a boundary between the first member and the third core and a boundary between the second member and the third core, and the second insulating layer electrically insulates at least one of the boundary between the first member and the third core and the boundary between the second member and the third core.

8. The rotating electrical machine according to claim 7, wherein
the third core includes a slit-shaped third insulation section, and the third insulation section extends in the axial direction, and
the third core is integrally connected to the first member and the second member, and the third insulation section is disposed at a different position from at least one of the first insulation section and the second insulation section in the rotation direction.

9. The rotating electrical machine according to claim 6, wherein
the third core includes a slit-shaped third insulation section, and the third insulation section extends in the axial direction, and
the third core is integrally connected to the first member and the second member, and the third insulation section is disposed at substantially the same position as at least one of the first insulation section and the second insulation section in the rotation direction.

10. The rotating electrical machine according to claim 9, wherein
the third insulation section includes a first portion and a second portion, the first portion is disposed at substantially the same position as the first insulation section in the rotation direction, and the second portion is disposed at substantially the same position as the second insulation section in the rotation direction.

11. The rotating electrical machine according to claim 6, wherein
the third core is divided into at least a third member and a fourth member in the rotation direction, the third core comprises a connecting section and a third insulating layer, the third member and the fourth member are connected each other in the connection section, the third insulating layer is provided in the connecting section, and the third insulating layer electrically insulates the third member and the fourth member from each other, and
the third core is integrally connected to the first member and the second member, and the connecting section is disposed at substantially the same position as at least one of the first insulation section and the second insulation section in the rotation direction.

12. The rotating electrical machine according to claim 1, wherein the second insulation section is provided in a region which is different from a region between the first fixing member and the second fixing member in the rotation direction.

13. The rotating electrical machine according to claim 1, further comprising:
a plurality of basic units each comprising the winding, the stator core, and the rotor core, the plurality of basic units being arranged in the axial direction;
a spacer between the plurality of basic units; and
a fourth insulating layer provided in a boundary between one basic unit of the plurality basic units and the spacer, the fourth insulating layer electrically insulating the basic unit and the spacer from each other.

14. The rotating electrical machine according to claim 1, further comprising:
a plurality of basic units each comprising the winding, the stator core, and the rotor core, the plurality of basic units being arranged in the axial direction; and
a spacer between the plurality of basic units,
wherein
the spacer includes slit-shaped fourth insulation section, and the fourth insulation section extends in the axial direction, and
the spacer is integrally connected to the first member and the second member, and the fourth insulation section is disposed at substantially the same position as at least one of the first insulation section and the second insulation section in the rotation direction.

15. A rotating electrical machine comprising:
a shaft;
an annular winding extending in a rotation direction of the shaft
a stator core comprising a plurality of stator magnetic poles, the plurality of stator magnetic poles being arranged along the winding; and
a rotor core comprising a plurality of rotor magnetic poles, the plurality of rotor magnetic poles being configured to face the plurality of stator magnetic poles,
wherein
at least one of the stator core and the rotor core comprises a first member and a second member, the first member and the second member are formed in annular shape, and the first member and the second member overlap each other in an axial direction of the shaft,
the first member includes a slit-shaped first insulation section, and the first insulation section extends in the axial direction,
the second member includes a slit-shaped second insulation section, and the second insulation section extends in the axial direction,
the first member and the second member are integrally connected, and the first insulation section and the second insulation section are disposed at different positions in the rotation direction,
the stator core comprises a first core, a second core, and a third core,
the first core and the second core are separated from each other in the axial direction, and the first core and the second core are inside the third core,
the third core encloses the first core and the second core from outside in the radial direction, and the third core magnetically connects the first core and the second core, and at least one of the first core and the second core comprises the first member and the second member, and at least a part of the third core is electrically insulated from at least one of the first member and the second member.

16. The rotating electrical machine according to claim 15, wherein
at least one of the stator core and the rotor core comprises a first insulating layer that is a solid insulating layer provided in a boundary between the first member and the second member, and the first insulating layer electrically insulates the boundary between the first member and the second member.

17. A rotating electrical machine comprising:
a shaft
an annular winding extending in a rotation direction of the shaft
a stator core comprising a plurality of stator magnetic poles, the plurality of stator magnetic poles being arranged along the winding; and
a rotor core comprising a plurality of rotor magnetic poles, the plurality of rotor magnetic poles being configured to face the plurality of stator magnetic poles,
wherein
at least one of the stator core and the rotor core comprises a first member and a second member, the first member and the second member are formed in annular shape, and the first member and the second member overlap each other in an axial direction of the shaft,
the first member includes a slit-shaped first insulation section, and the first insulation section extends in the axial direction,
the second member includes a slit-shaped second insulation section, and the second insulation section extends in the axial direction,
the first member and the second member are integrally connected, and the first insulation section and the second insulation section are disposed at different positions in the rotation direction,
the rotor core comprises a first core, a second core, and a third core,
the first core and the second core are separated from each other in the axial direction,
the third core includes a first portion inserted inside the first core and a second portion inserted in the second core, the third core faces the first core and the second core from inside in the radial direction, and the third core magnetically connects the first core and the second core, and
at least one of the first core and the second core comprises the first member and the second member, and at least a part of the third core is electrically insulated from at least one of the first member and the second member.

18. The rotating electrical machine according to claim 17, wherein
at least one of the stator core and the rotor core comprises a first insulating layer that is a solid insulating layer provided in a boundary between the first member and the second member, and the first insulating layer electrically insulates the boundary between the first member and the second member.

* * * * *